United States Patent
Meyers et al.

(10) Patent No.: US 10,934,700 B2
(45) Date of Patent: Mar. 2, 2021

(54) DRAIN SYSTEM FOR USE WITH A TILE FLOOR

(71) Applicant: EBBE AMERICA, LC, Clearfield, UT (US)

(72) Inventors: Alden S. Meyers, Clearfield, UT (US); Lawrence G. Meyers, Clearfield, UT (US)

(73) Assignee: EBBE AMERICA, LC, Clearfield, UT (US)

( * ) Notice: Subject to any disclaimer, the term of this patent is extended or adjusted under 35 U.S.C. 154(b) by 0 days.

(21) Appl. No.: 16/884,874

(22) Filed: May 27, 2020

(65) Prior Publication Data

US 2020/0284019 A1 Sep. 10, 2020

Related U.S. Application Data

(63) Continuation-in-part of application No. 16/682,074, filed on Nov. 13, 2019.

(60) Provisional application No. 62/871,549, filed on Jul. 8, 2019, provisional application No. 62/775,245, filed on Dec. 4, 2018.

(51) Int. Cl.
*E03F 5/04* (2006.01)

(52) U.S. Cl.
CPC .......... *E03F 5/0408* (2013.01); *E03F 5/0409* (2013.01); *E03F 2005/0413* (2013.01)

(58) Field of Classification Search
CPC .............. E03F 5/0208; E03F 5/0409; E03F 2005/0413
USPC ........................................................ 52/169.5
See application file for complete search history.

(56) References Cited

U.S. PATENT DOCUMENTS

| 1,766,621 | A | * | 6/1930 | Fleming | E03F 5/0409 210/165 |
| 2,519,843 | A | * | 8/1950 | Matheis | E03F 5/0407 210/165 |
| 2,780,303 | A | * | 2/1957 | Yavitch | G01M 3/00 4/615 |
| 2,783,852 | A | * | 3/1957 | Sisk | E03F 5/0409 210/165 |
| 2,859,452 | A | * | 11/1958 | Seewack | E03F 5/0408 210/165 |

(Continued)

FOREIGN PATENT DOCUMENTS

FR 2979577 6/2016

OTHER PUBLICATIONS

International Search Report and Written Opinion for PCT/US2019/61084, dated Jan. 29, 2020.

(Continued)

*Primary Examiner* — Jeanette E Chapman
(74) *Attorney, Agent, or Firm* — Workman Nydegger

(57) ABSTRACT

A drain system includes a support frame configured to support and position a drain cover over a drain opening in a tile floor. The support frame has a base portion and a wall portion projecting upwardly from the base portion to define a seat for the drain cover within the support frame. A release surface on the wall portion tapers and slopes inwardly from a top of the wall portion. The release surface is arranged to interface with the drain cover and reduce frictional and shear forces between the drain cover and the support frame during removal of the drain cover from the support frame.

20 Claims, 20 Drawing Sheets

(56) References Cited

U.S. PATENT DOCUMENTS

| | | | | |
|---|---|---|---|---|
| 4,423,527 | A * | 1/1984 | Morris | E03F 5/0407 |
| | | | | 4/288 |
| 4,694,513 | A * | 9/1987 | Kiziah | E03F 5/0408 |
| | | | | 285/136.1 |
| 4,943,100 | A * | 7/1990 | Emberson | E03F 5/0407 |
| | | | | 210/164 |
| 5,022,430 | A * | 6/1991 | Degooyer | E03F 5/0407 |
| | | | | 137/362 |
| 8,043,497 | B2 | 10/2011 | Silverstein et al. | |
| 8,060,956 | B2 | 11/2011 | DeGooyer | |
| 8,191,330 | B1 | 6/2012 | Cornwall | |
| 8,833,387 | B2 | 9/2014 | Lucas et al. | |
| 9,175,464 | B2 | 11/2015 | Meyers | |
| 9,453,331 | B1 | 9/2016 | Buffington | |
| 9,731,441 | B2 | 8/2017 | DeJesus et al. | |
| 9,848,742 | B2 | 12/2017 | Phillips | |
| 2007/0209109 | A1 | 9/2007 | Meyers | |
| 2008/0106094 | A1 * | 5/2008 | Edelmayer | E03F 5/0407 |
| | | | | 285/42 |
| 2008/0189926 | A1 | 8/2008 | Luxton | |
| 2008/0277324 | A1 | 11/2008 | Meyers | |
| 2010/0235982 | A1 | 9/2010 | Stimpson et al. | |
| 2010/0288685 | A1 | 11/2010 | Meyers | |
| 2010/0320130 | A1 | 12/2010 | Meyers | |
| 2014/0130902 | A1 | 5/2014 | Lucas et al. | |
| 2015/0275497 | A1 * | 10/2015 | Nyce | E03F 5/0409 |
| | | | | 52/302.1 |
| 2016/0281346 | A1 | 9/2016 | Clear et al. | |
| 2017/0058504 | A1 | 3/2017 | Wilkie | |
| 2017/0138036 | A1 * | 5/2017 | Priester | E03F 5/0409 |
| 2019/0242107 | A1 | 8/2019 | McLeod | |
| 2019/0316554 | A1 * | 10/2019 | Berg | F02M 37/08 |

OTHER PUBLICATIONS

Schluter®—Kerdi-Drain-Ar; http://www.schulter.com/schluter-us/en_US/Shower-System/Drains/Schluter®-KERDI-DRAIN-AR/p/KERDI_DRAIN-AR Retrieved on Dec. 19, 2016.

* cited by examiner

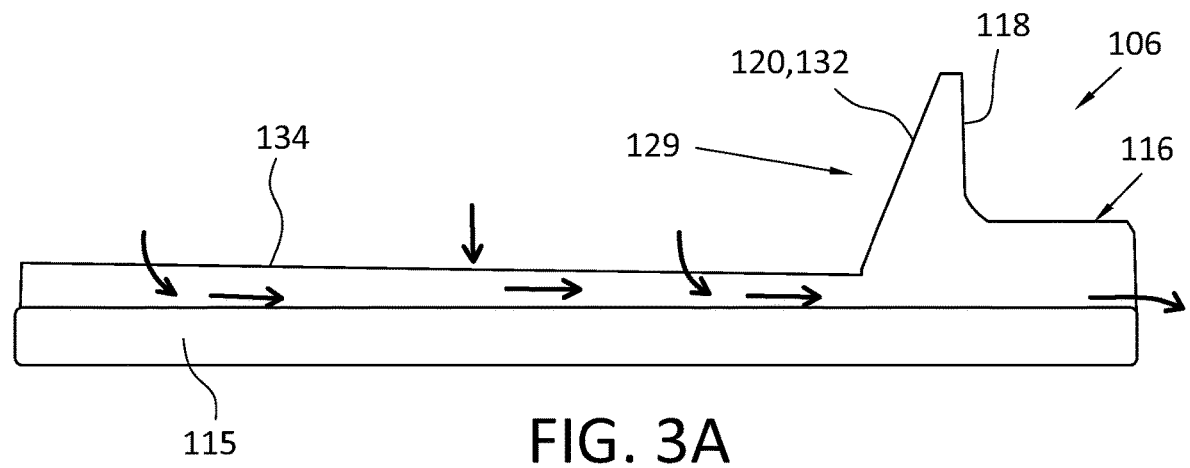
FIG. 3A
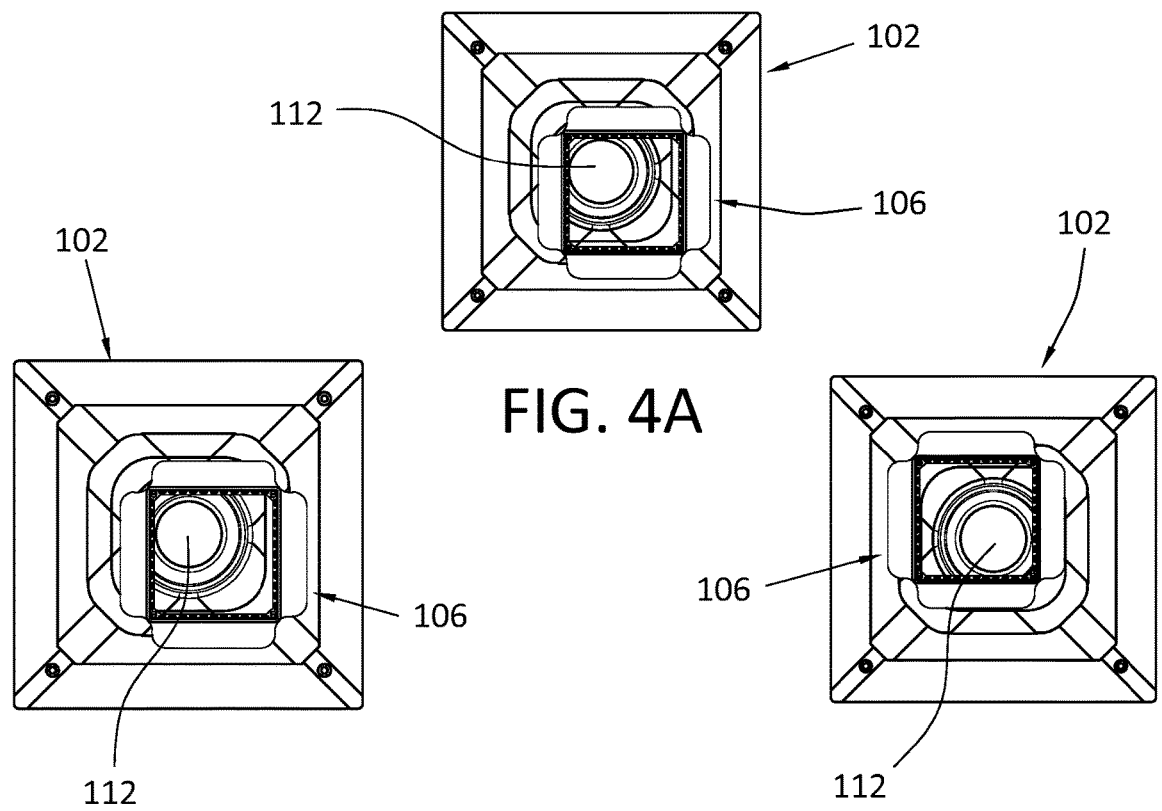
FIG. 4A
FIG. 4B
FIG. 4C

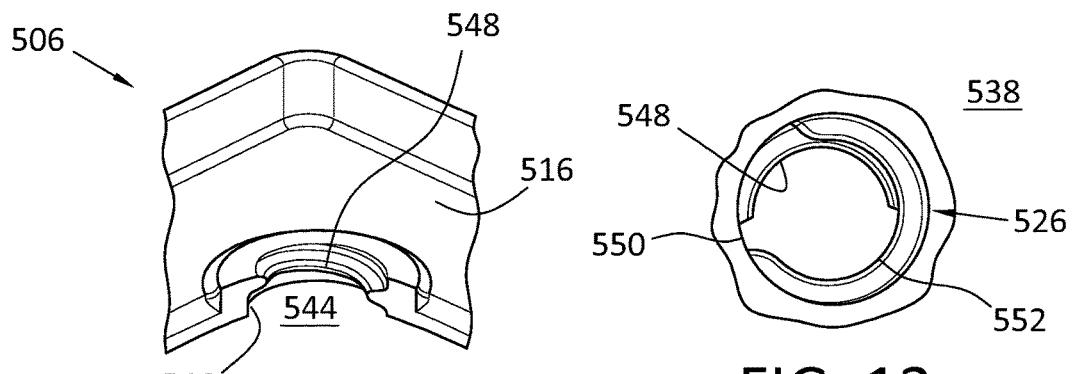
FIG. 12
FIG. 13
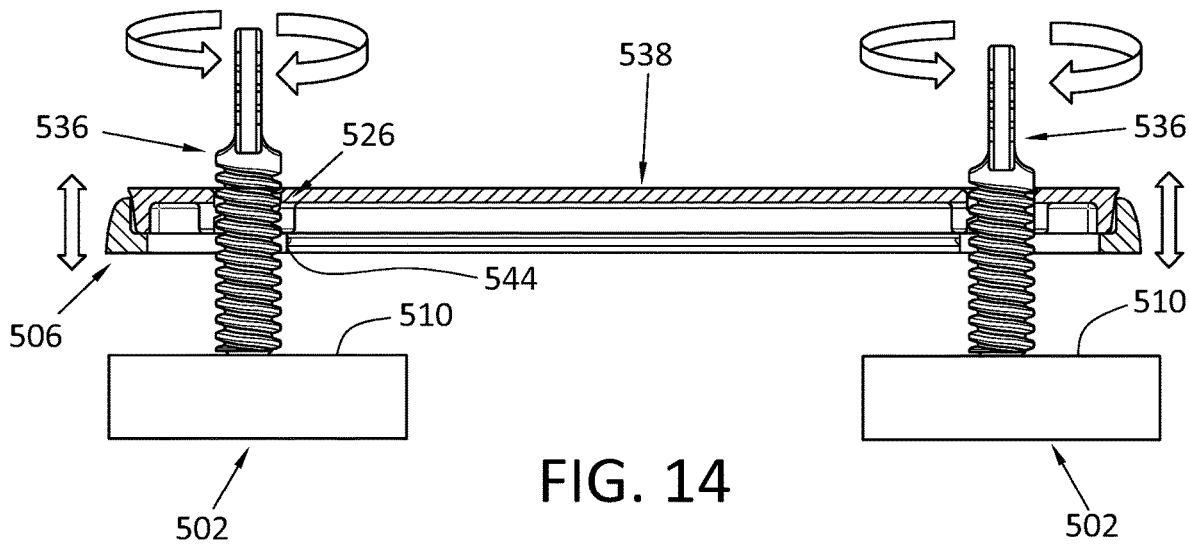
FIG. 14
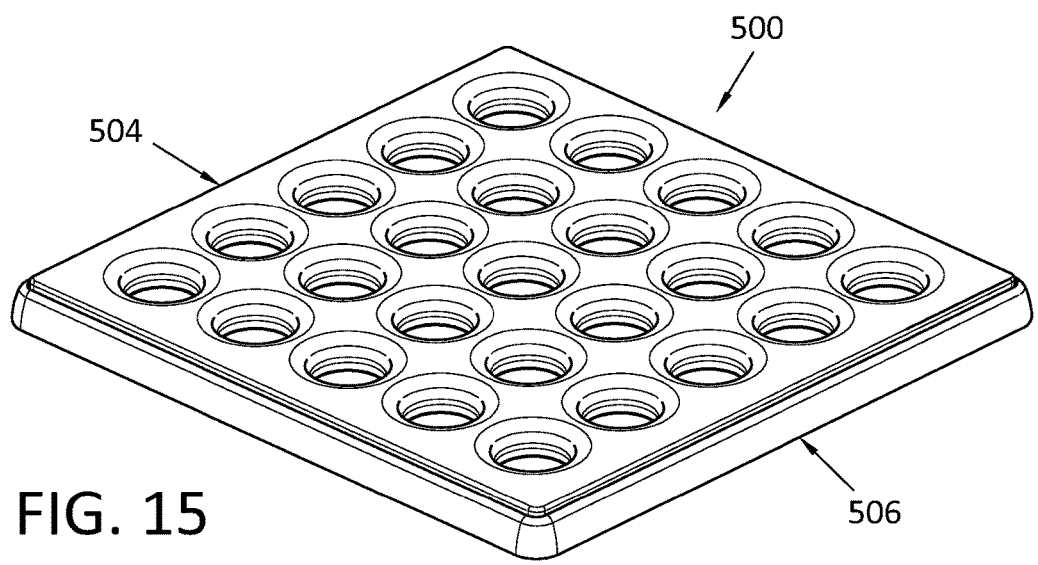
FIG. 15

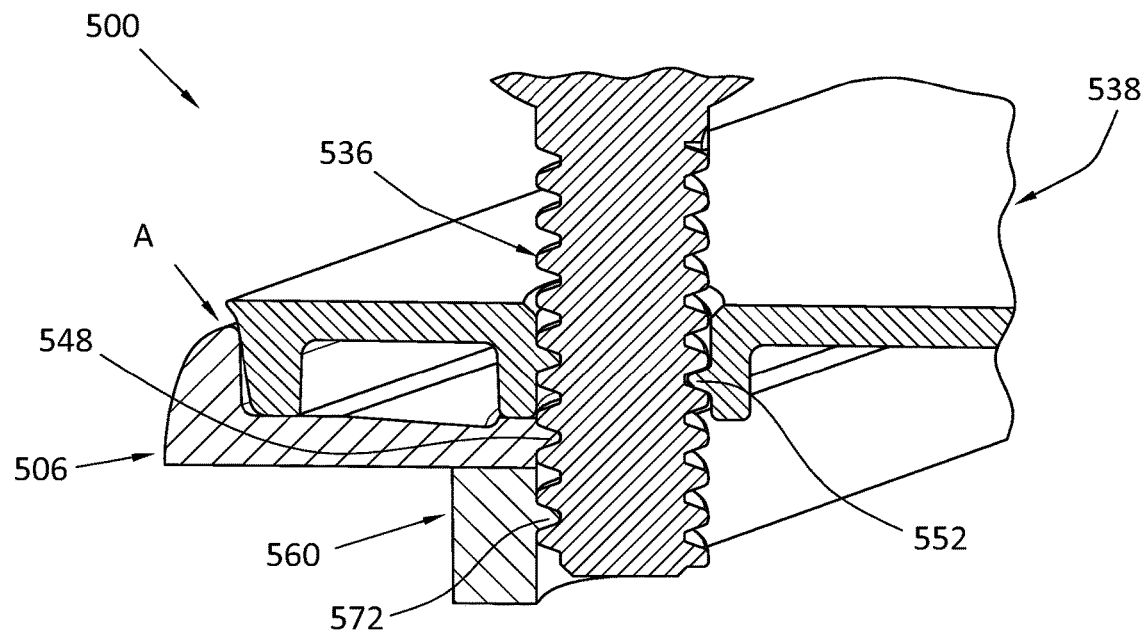
FIG. 19
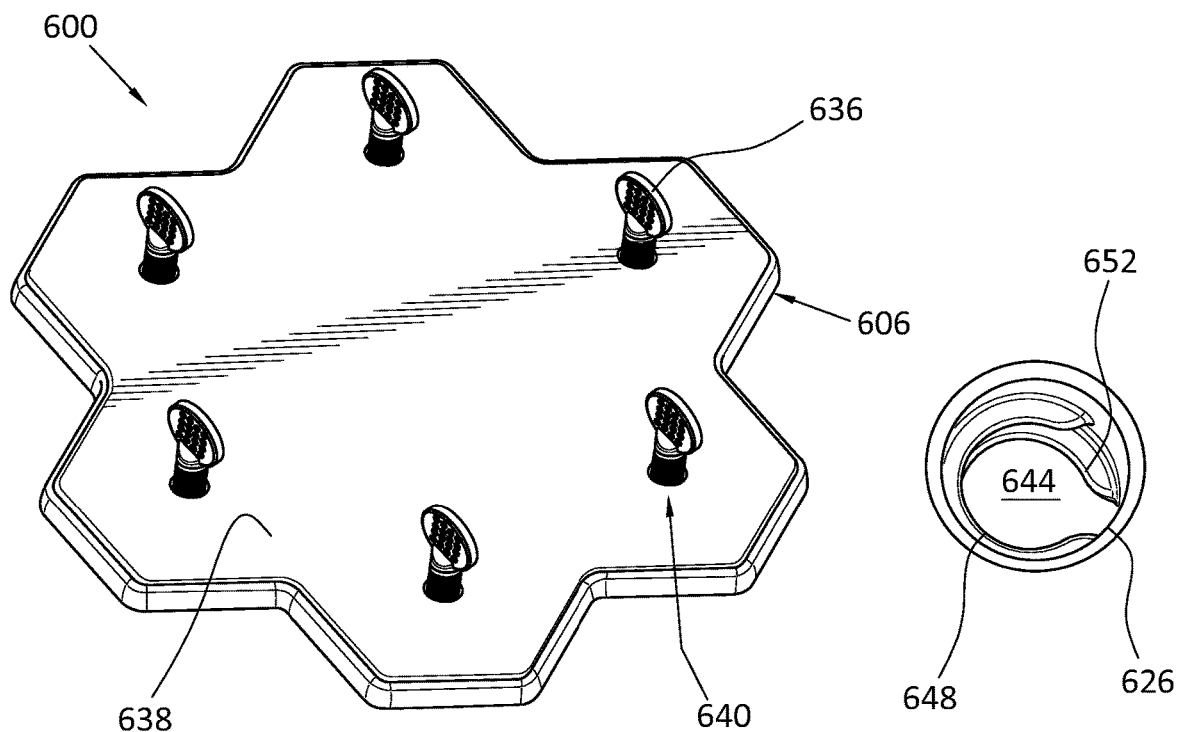
FIG. 20
FIG. 21

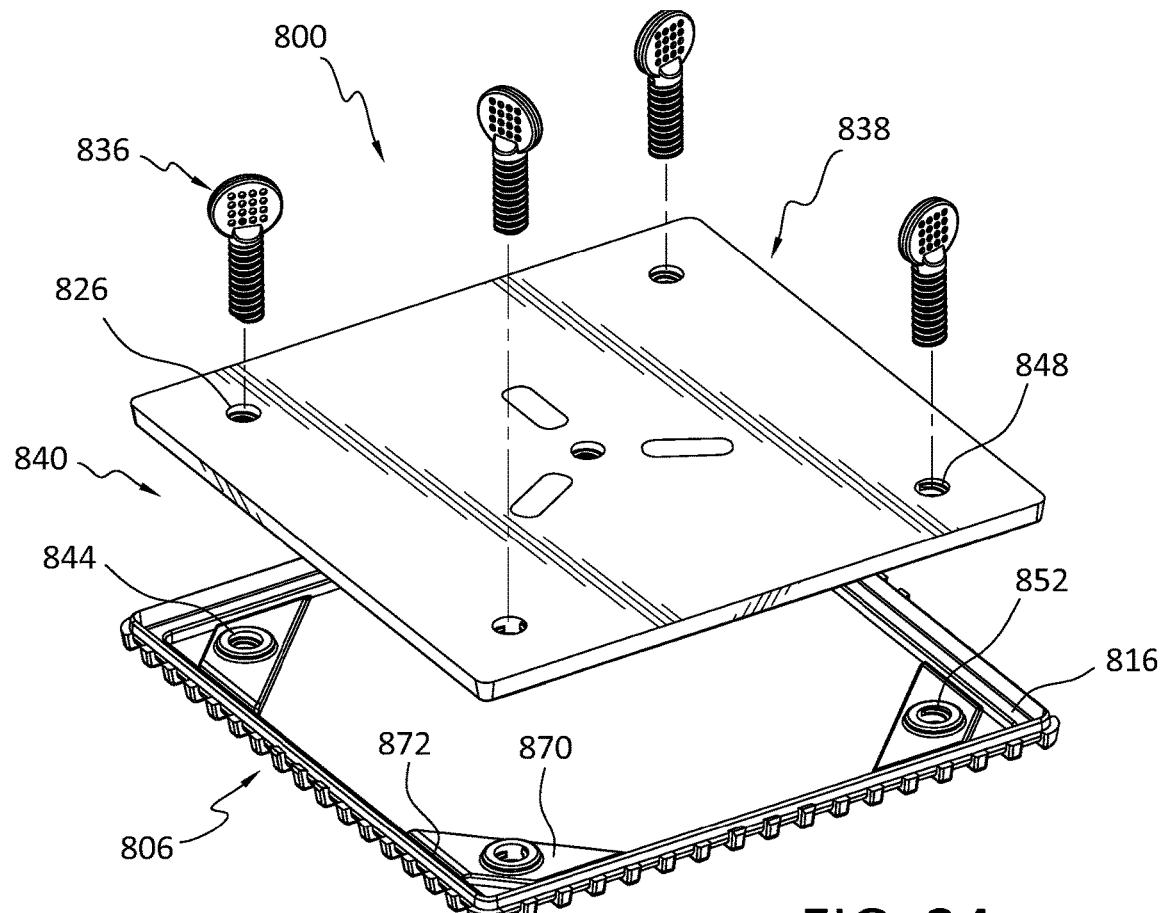
FIG. 24
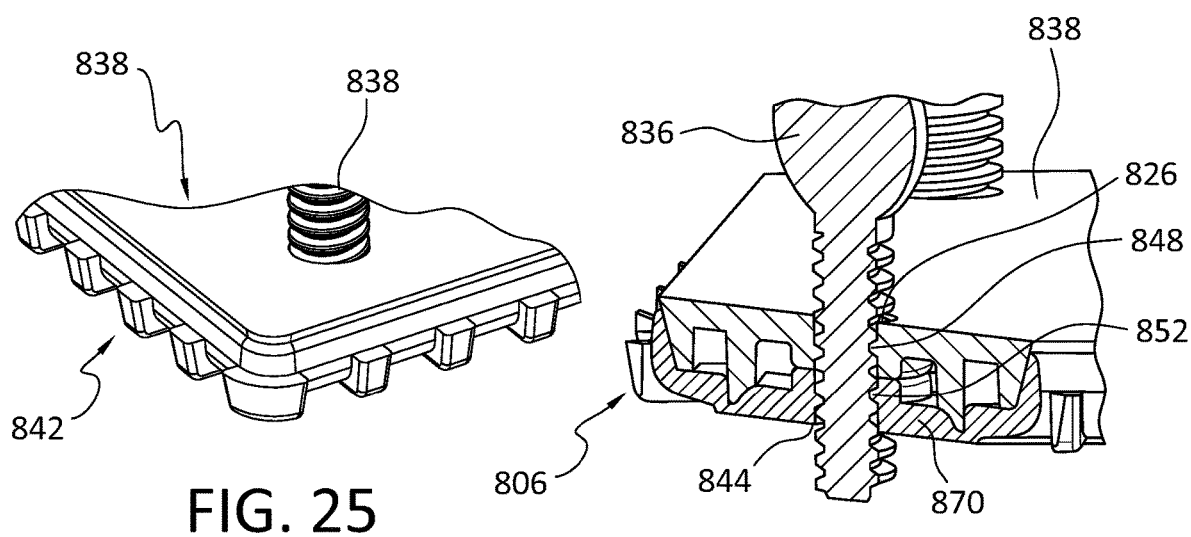
FIG. 25
FIG. 26

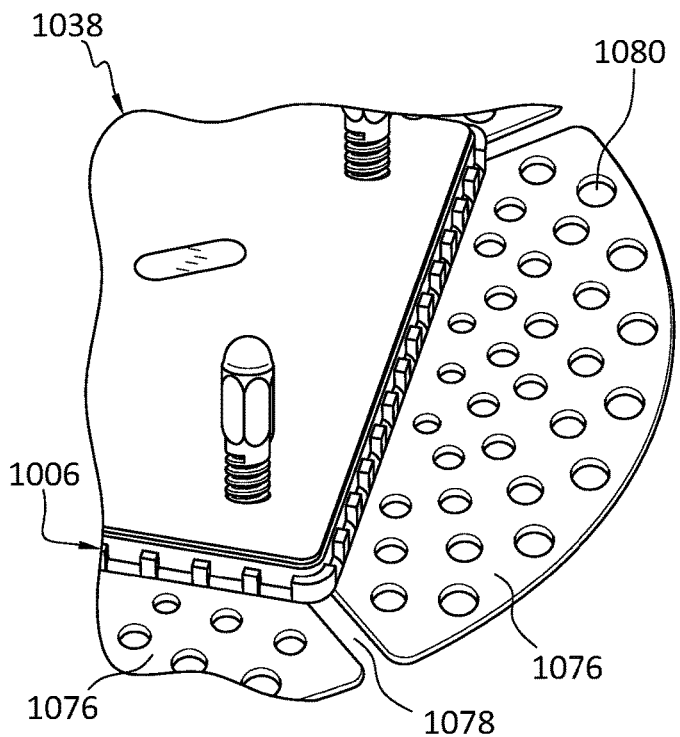
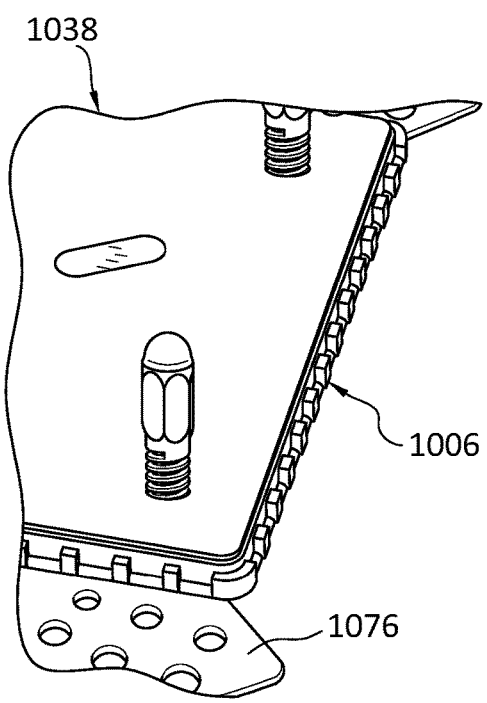
FIG. 35
FIG. 36
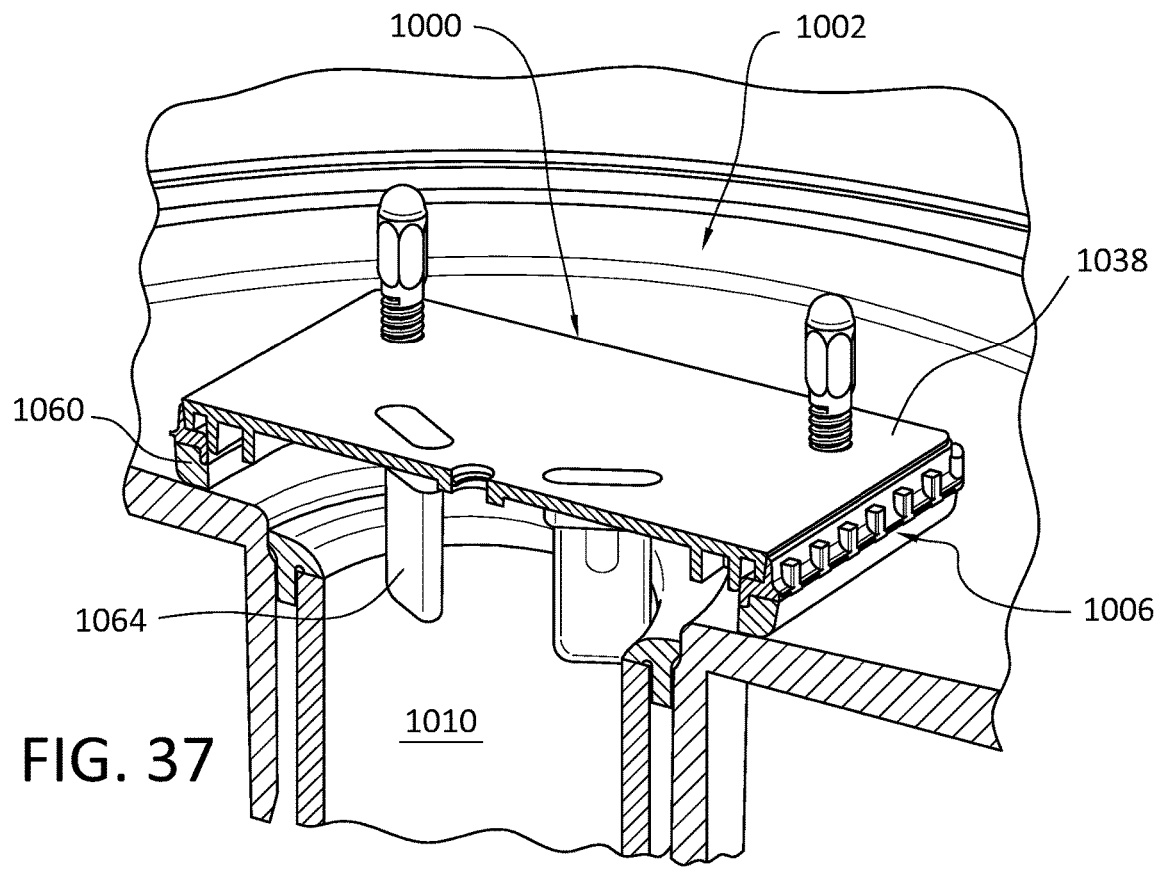
FIG. 37

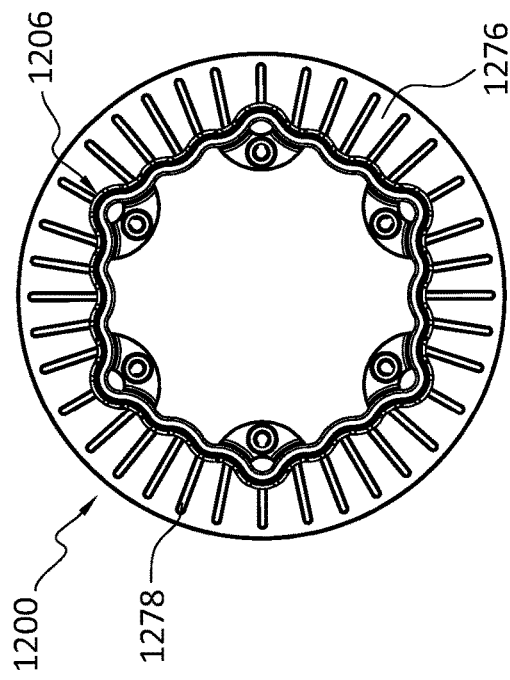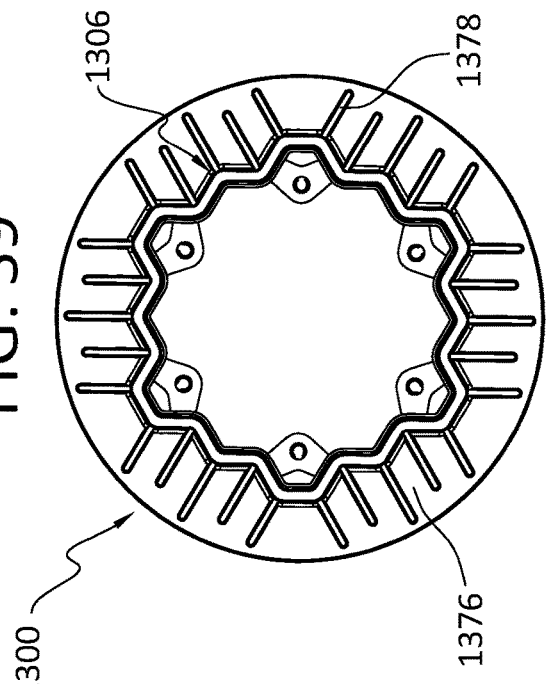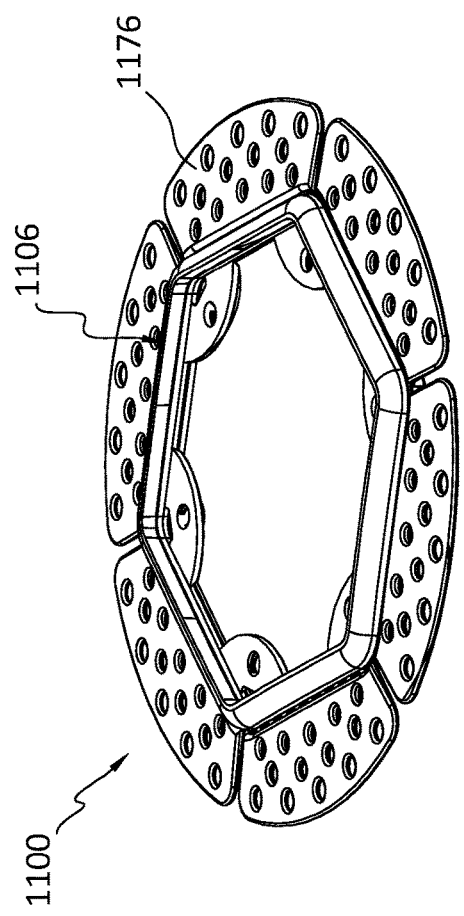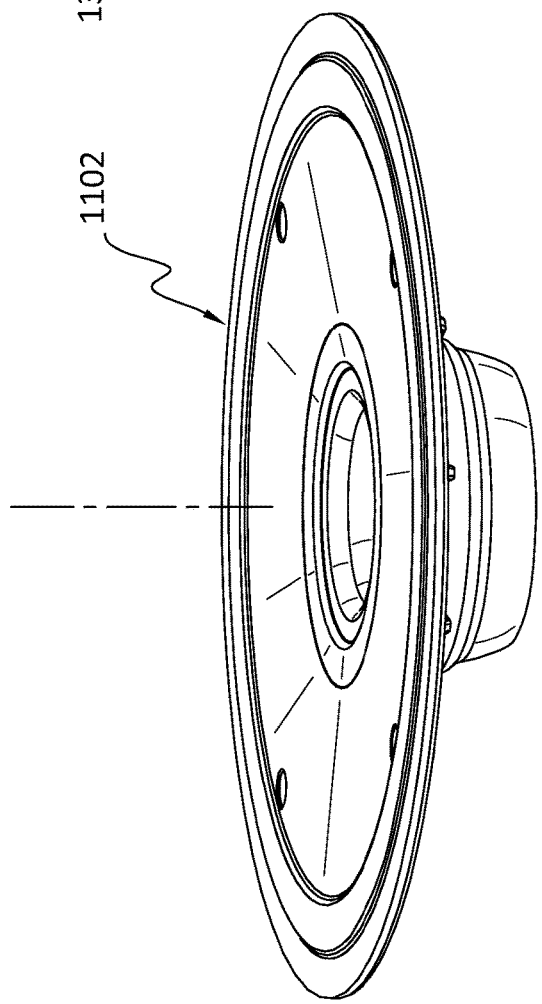

DRAIN SYSTEM FOR USE WITH A TILE FLOOR

TECHNICAL FIELD

The disclosure relates to a drain system for installation with a tile floor.

BACKGROUND

Bathrooms, showers, and kitchens are often provided with tiled floors. In showers, a drain is typically placed in or near the center of the shower and the floor is sloped slightly towards the drain to ensure that water runs into the drain. As can be appreciated, tiling a floor that slopes in different directions towards the drain can be difficult and time consuming especially if localized reversed slopes and other slope anomalies are to be avoided. Moreover, tiling a floor can be even more challenging when the tiles approaching the drain are irregularly shaped, requiring excessive cutting or shifting of the tiles. Challenges also arise when the drain is an existing drain that must be replaced, height adjusted, or referenced as a benchmark to match the new tile surface.

For instance, traditional shower drain systems have a drain head or riser connecting to a lower drain via a threaded connection such that to make fine height adjustments one must rotate the drain head relative to the lower drain. This generally does not work well when the drain head is square or non-circular because surrounding tiles in a tile installation can prevent rotation. As such, fine height adjustments of square and non-circular drain heads have been required to be made before tiling around the drain head, and no vertical adjustment can be made when mortar and tile surround the drain head as they prevent rotation. In addition, the drain head is typically on the jobsite when the tile installer arrives and is often not located in an optimal position within the shower floor area. It also is often not installed vertical or plumb. Because the tile installer normally does not want to do plumbing, the tile installer is resigned to working around the poorly positioned drain head, and the threaded connection between the drain head and the lower drain often prevents the drain head from being corrected to plumb.

By way of another example, after a square drain head is raised to the needed height, the tile installer normally uses his or her best effort to make sure the drain head is aligned or square to a dominate wall before packing mortar around the drain head to immobilize it. The tile installer then does a tile layout where he or she plans the layout of tile, such as mosaic tile, that will surround the drain head. During the subsequent tile installation, a relatively small drain cover fitted on the immobilized, square drain head often proves not to align with the surrounding mosaic tile as the tile installer desired or hoped for, frustrating the tile installer and disrupting the aesthetics of the installed mosaic tile floor.

Some drain systems have attempted to incorporate adjustable features to better align the drain head with surrounding tile. However, such drain systems have connections between the drain head and the lower drain that are known to be unstable and offer inadequate adjustability.

Accordingly, there is a need for a drain system that incorporates certain design improvements over other systems for streamlined and improved installation in a tile floor.

SUMMARY

Embodiments of the present disclosure advantageously provide drain systems that incorporate design improvements over other systems for streamlined and improved installation. The drain system embodiments can further be used with a wide variety of drain products, including retrofit and new installations.

According to an embodiment, a drain system includes a support frame installable in a tile floor. The support frame includes a base portion and a wall portion that forms a seat for a drain cover within the support frame. The wall portion defines a cover-facing surface arranged to interface with the drain cover, and a tile-facing surface arranged to face one or more tiles surrounding the support frame. One or more material locking features are on the tile facing surface to help retain grout between the support frame and the surrounding tiles.

During installation of the support frame in the tile floor, the vertical position of the support frame over the drain opening is adjustable and the support frame does not extend downwardly into the drain opening such that the support frame is floatable over the drain opening for lateral and rotational adjustment of the support frame relative to the drain opening. This floating configuration of the support frame is advantageous because it allows the support frame to be aligned or squared to a dominate wall or other benchmark, such as surrounding tiles, up until when the adjacent tiles are installed around the support frame during a tile installation, streamlining installation and improving the aesthetics of the tile floor.

The floating configuration of the support frame can also allow the drain system to be compatible with different drain components and projects. For instance, the support frame can be used in a retrofit application. If a drain installation includes a floor that is already tiled, an installer can simply apply a bonding agent to the support frame and selectively position the support frame over the existing drain opening and then tile over the existing tile floor up to the support frame. This substantially decreases the time required to install the drain system when compared to prior art drain systems that require demolition and/or complicated tie ins to an existing drain fixture below the existing tile floor.

According to a variation, the vertical position and/or pitch of the support frame is adjustable relative to an underlying drain fixture. For instance, the drain system can include a plurality of set screws that can be selectively manipulated to adjust the position of the support frame relative to the underlying drain fixture. This beneficially can help ensure that the height and/or angle of the support frame better matches that of surrounding tiles at the junction between the support frame and the tiles, improving the look and function of the drain system. Moreover, the height of the support frame can be adjusted without having to rotate the support frame or a drain head as required in the prior art. The set screws also can provide stability at the level the set screws are set to until mortar solidifies around the support frame.

According to a variation, the drain cover comprises a construction plug, and the drain system includes a locking system that selectively locks the construction plug and the support frame together. This allows the construction plug and the support frame to move together when the construction plug is coupled to the support frame, which also can advantageously allow for adjustment of the vertical position, height, and/or angle of the support frame relative to the upper surface of an underlying drain fixture or other underlying surface during a tile floor installation. It also helps prevent unintentional removal of the construction plug from the support frame during an installation, increasing protection of the underlying drain fixture.

BRIEF DESCRIPTION OF THE DRAWINGS

These and other features, aspects, and advantages of the present disclosure will become better understood regarding the following description, appended claims, and accompanying drawings.

FIG. 3A is a side cross section view of a support frame according to an embodiment.

FIGS. 4A-4C show different top views of the drain system in FIG. 1 with the support frame in different positions on the drain fixture.

FIG. 12 is a perspective detailed view of the support frame in FIG. 10.

FIG. 13 is a top detailed view of the drain cover in FIG. 10.

FIG. 14 is a cross section view of the drain system in FIG. 10.

FIG. 15 is a side perspective view of the drain system in FIG. 10 including another drain cover.

FIG. 19 is another cross-section view of the drain system in FIG. 10

FIG. 20 is a top perspective view of a drain system according to another embodiment.

FIG. 21 is a detailed top view of the drain cover in FIG. 20.

FIG. 24 is a top exploded view of a drain system according to another embodiment.

FIG. 25 is a detailed view of the drain system in FIG. 24.

FIG. 26 is a cross section of the drain system in FIG. 24.

FIG. 35 is a detailed top view of the drain system in FIG. 31.

FIG. 36 is another detailed top view of the drain system in FIG. 31.

FIG. 37 is a perspective cross section view of the drain system in FIG. 31 installed on a drain body.

FIG. 38 is an exploded view of a drain system according to another embodiment.

FIG. 39 is a top view of a drain system according to another embodiment.

FIG. 40 is a top view of a drain system according to another embodiment.

Figure 1:
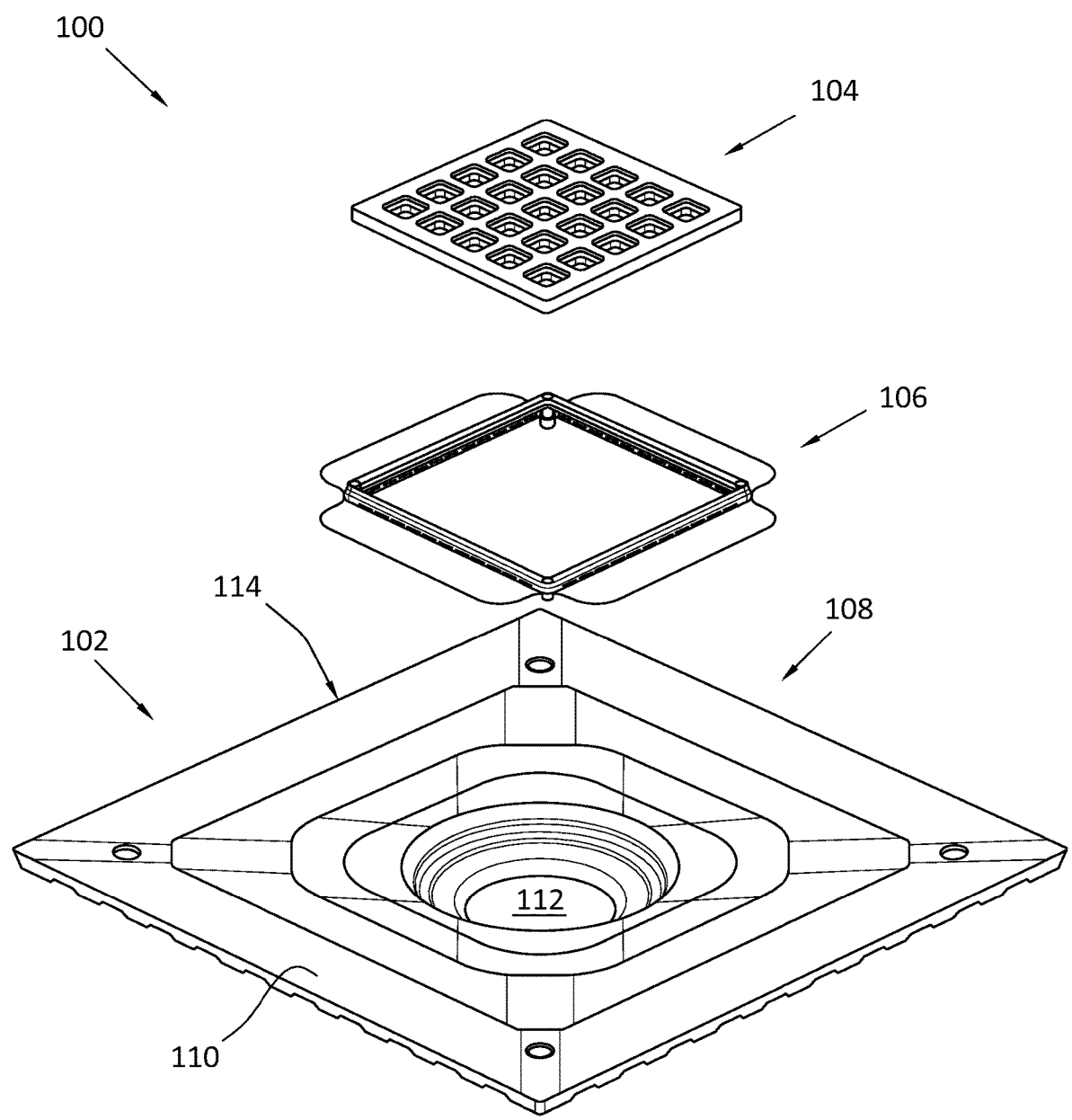
FIG. 1 is a side perspective view of a drain system including a support frame according to an embodiment.

The drawing figures are not necessarily drawn to scale, but instead are drawn to provide a better understanding of the components, and are not intended to be limiting in scope, but to provide exemplary illustrations. The figures illustrate exemplary configurations of drain systems, and in no way limit the structures or configurations of a drain system and components according to the present disclosure.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning.

Embodiments of the present disclosure advantageously provide drain systems that incorporate certain design improvements over other systems for streamlined and improved installation. The drain system embodiments can be easily adjusted without having to rotate a riser or drain head as in the prior art. The drain system embodiments can also be aligned or squared with a dominate wall or other benchmark such as surrounding tiles up until when tiles are installed adjacent a support frame of the drain system during a tile installation. The drain system embodiments can further be used with a wide variety of drain products, including retrofit and new installations.

FIG. 1 illustrates a drain system 100 according to an embodiment including a drain fixture 102, a drain cover 104, and a support frame 106 configured to support and position the drain cover 104 on the drain fixture 102 during and after the installation of one or more tiles adjacent to the support frame 106. In the illustrated embodiment, the drain cover 104 can comprise a drain grate having a perforated configuration defining openings that allow water to drain through the drain cover 104 into a drain opening 112 below.

The drain fixture 102 is shown comprising a body 108 including an upper surface 110 defining a drain opening 112 and a lateral flange 114 surrounding the drain opening 112, but in other embodiments the drain fixture 102 can comprise any suitable drain component on which the support frame 106 can be positioned as described below. For instance, the drain fixture 102 can comprise a round tile-in shower drain, an existing drain body in a tile floor, a square or round drain riser, or any other suitable drain component. The drain fixture 102 can be made of metal, plastic, ceramic, combinations thereof, or any other suitable material. As described below, the configuration of the support frame 106 allows it to be retrofitted with existing drain fixtures or different shaped drain fixtures to simplify and improve the installation of a tile floor surrounding the support frame 106.

Figure 2:
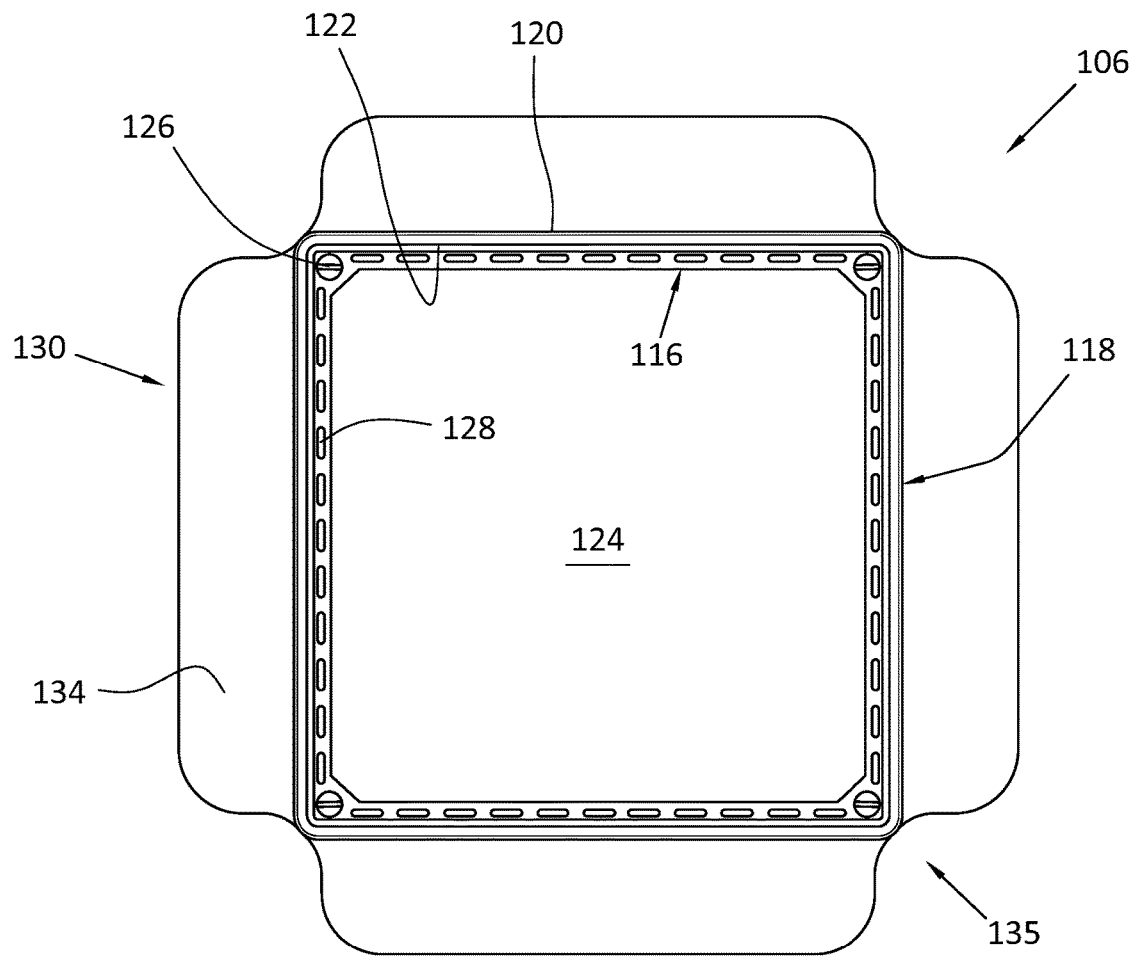
FIG. 2 is a top view of the support frame of FIG. 1.
Figure 3:
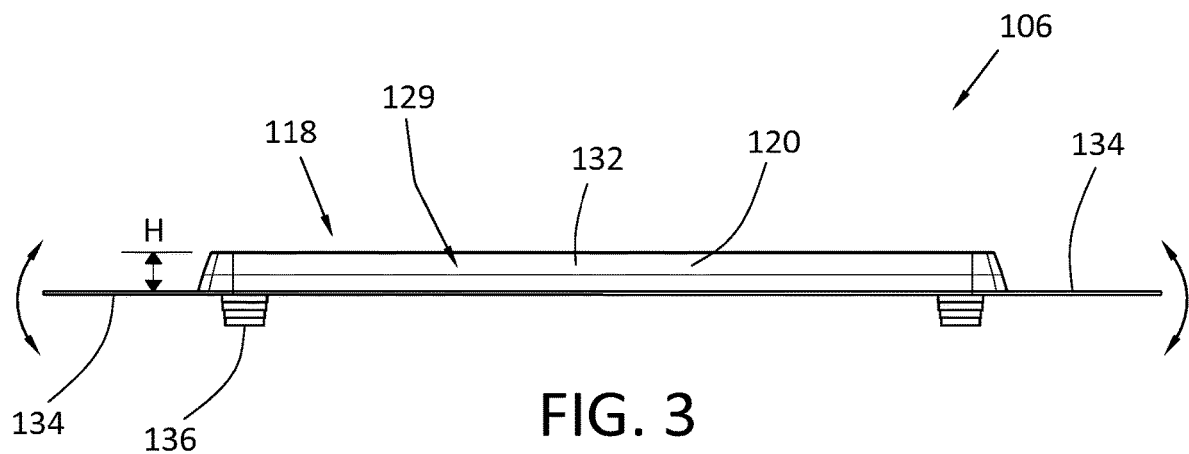
FIG. 3 is a side view of the support frame of FIG. 1.

Referring to FIGS. 2 and 3, the support frame 106 includes a base portion 116 and a wall portion 118 projecting upwardly from the base portion 116. The wall portion 118 defines a tile-facing surface 120 arranged to face adjacent tiles, and a cover-facing surface 122 opposing the tile-facing surface 120 and arranged to interface with the drain cover 104. The base portion 116 extends radially inward from a lower end of the wall portion 118 and defines an opening 124 in communication with the drain opening 112 of the drain fixture 102.

The base portion 116 and the wall portion 118 define a seat for the drain cover 104 with the support frame 106. More particularly, the base portion 116 supports a lower surface of the drain cover 104 above the drain fixture 102, and the cover-facing surface 122 of the wall portion 118 can engage with the outer periphery of the drain cover 104 to restrict or limit lateral movement of the drain cover 104 relative to the support frame 106 when the drain cover 104 is positioned in the support frame 106. The wall portion 118 also provides a physical barrier between the drain cover 104 and the tiles surrounding the drain cover 104. The support frame 106 thus retains and protects the drain cover 104 within a tile floor.

According to an embodiment, the base portion 116 defines a plurality of threaded holes 126. The threaded holes 126 can be in corner areas or areas where two or more sides of the base portion 116 meet, and are configured to receive one or more set screws described below for adjusting the vertical position or height and/or angle of the support frame 106 relative to the drain fixture 102 during a tile installation. This is advantageous because the vertical position of the support frame 106 can be adjusted without having to rotate the support frame 106 or drain head as in the prior art. In addition, the angle of the support frame 106 can be adjusted as desired, such as correcting the support frame 106 to plumb. Moreover, the set screws provide stability at the level they are set to until mortar solidifies Optionally, the base portion 116 can define a plurality of openings or slots 128 configured to allow mortar and/or another material to extend into the slots 128 and provide a mechanical lock between the base portion 116 and a filler material applied below the base portion 116. The slots 128 can have a variety of shapes such as ovals, squares, rectangles and other available shapes that may be formed in the base portion 116, and the slots 128 may be formed in any suitable pattern.

The support frame 106 and the drain cover 104 are shown having generally rectangular shapes. However, the shape and size of the support frame 106 can vary according to the shape and size of the drain cover 104 and/or tiles adjacent to the support frame 106 in a tile floor. For instance, the support frame 106 can comprise a molded plastic member including an outer periphery having a square shape arranged to mate or fit within a square opening defined by a plurality of square tiles surrounding the support frame 106. In other embodiments, the support frame 106 can include an outer periphery having a honeycomb shape arranged to mate or fit within a honeycomb shaped opening defined by a plurality of hexagonal tiles surrounding the support frame 106. In other embodiments, the support frame 106 can have a triangular, rectangular, diamond, irregular shape, combinations thereof, or any other suitable shape. Likewise, the inner periphery of the support frame 106 or the wall portion 118 can generally correspond to the shape of the drain cover 104. The versatility of the support frame 106 beneficially allows the drain system 100 to work with more tile shapes and drain cover shapes than existing drain systems.

According to a variation, the inner and outer peripheral shapes of the support frame 106 can be different from each other. For instance, the inner periphery of the support frame 106 can have a square shape arranged to mate with a drain cover having a square shape, and the outer periphery of the support frame 106 can have a hexagonal shape arranged to mate or fit within a hexagonal-shaped opening defined by a plurality of hexagonal tiles. The support frame 106 can be formed of a metal material such as aluminum or steel, or of a rigid polymeric or ceramic material. In other embodiments, the support frame 106 can be flexible or semiflexible to provide some tolerance in a fit between the drain cover 104 and/or the surrounding tiles. In other embodiments, the support frame 106 can comprise a molded plastic member.

At least the tile-facing surface 120 of the wall portion 118 can include one or more material locking features 129 configured to help form mechanical or micromechanical bonds between the support frame 106 and tiles surrounding the support frame 106 during installation. This beneficially helps limit separation between the support frame 106 and the surrounding tiles during installation or over time, improving aesthetics of the drain system 100 and conveying water toward the drain opening 112. The one or more material locking features 129 can be integrally formed on at least the tile-facing surface 120, integrally molded onto at least the tile-facing surface 120 or attached thereto in any suitable manner.

In an embodiment, the one or more material locking features 129 comprise at least one fabric layer 130 that extends along the tile-facing surface 120 of the wall portion 118. The connection between the at least one fabric layer 130 and the support frame 106 can be limited to the vertically extending portion of the tile-facing surface 120 of the wall portion 118. The at least one fabric layer 130 can provide a smoother transition between the support frame 106 and adjacent tiles than in existing systems. The at least one fabric layer 130 can also help create mechanical or micromechanical bonds between the support frame 106 and grout and/or other material applied to the at least one fabric layer 130.

According to a variation, the at least one fabric layer 130 can include a first part 132 located on the tile-facing surface 120 of the wall portion 118 and a cover-facing surface 122 may be included as a tileable flap 134 that is movable or foldable relative to a connection between the at least one fabric layer 130 and a bottom of the wall portion 118 or a bottom of the support frame 106. The first part 132 can be integrally molded onto the tile-facing surface 120 or attached in any suitable manner.

The tileable flap 134 can extend or drop below the first part 132. The tileable flap 134 can extend below adjacent tiles and a substrate (e.g., thinset mortar) supporting the tiles, providing enhanced continuity between the support frame 106 and the tiles. The tileable flap 134 can be manufactured or trimmed such that an attachment area between the tileable flap 134 and adjacent tiles can be adjustable or customized as needed. For instance, the tileable flap 134 can have a greater length in a radial direction such that the tileable flap 134 can extend a greater distance below the surrounding substrate and/or tiles.

The tileable flap 134 can extend entirely around the outer periphery of the wall portion 118. In an embodiment, the tileable flap 134 can define a plurality of cutouts 135 at the corner areas or areas where two or more sides of the tileable flap 134 meet. These cutouts 135 permit independent movement of tileable flap 134 along different sides of the wall portion 118 by allowing one side of the tileable flap 134 to fold without folding an adjacent side of the tileable flap 134. In other embodiments, the cutouts 135 can be omitted and the tileable flap 134 can extend continuously around the outer periphery of the wall portion 118. In other embodiments, the tileable flap 134 can extend only partially around the outer periphery of the wall portion 118. In an embodiment, the at least one fabric layer 130 is configured to retain both grout and/or mortar applied thereto.

The at least one fabric layer 130 is preferably a polyester material comprising a non-woven material defining a plurality of open spaces. These open spaces can fill with grout and/or mortar applied to the at least one fabric layer 130 to more securely attach the support frame 106 to tiles installed around the support frame 106.

For instance, as grout is applied to the tile-facing surface 120 during a tile installation project, the grout can penetrate or extend into the open spaces on the first part 132 of the at least one fabric layer 130 to mechanically and/or micromechanically lock the grout with the tile-facing surface 120 of the wall portion 118, which, in turn, helps retain the grout in the gap or space between the wall portion 118 and the tiles installed around the support frame 106. This beneficially helps direct water flowing off the tiles toward the drain cover 104 and improves the aesthetic appearance of the drain system 100. It also helps to retain the tiles and the drain system 100 in a desired configuration.

Likewise, as a substrate such as mortar (e.g. thinset) is applied to the tileable flap 134 of the at least one fabric layer 130 to set tiles around the support frame 106, the mortar can penetrate or extend into the open spaces of the tileable flap 134. As the mortar sets, the mortar within and/or around the tileable flap 134 can mechanically and/or micromechanically bond with the tileable flap 134, which, in turn, helps tie together the support frame 106 and the surrounding tiles and underlying substrate. This beneficially helps limit separation between the support frame 106 and the surrounding tiles during installation and over time, improving aesthetics of the drain system 100. While the at least one fabric layer 130 is described as a non-woven polyester material, in other embodiments, the at least one fabric layer 130 can comprise other materials such as woven materials or other synthetic materials. The at least one fabric layer 130 is preferably made from synthetic fibers to help prevent mold growth in the at least one fabric layer 130. Optionally, the tileable flap 134 can be omitted from the at least one fabric layer 130.

Optionally, the at least one fabric layer 130 can include a weep structure or weeping configuration that allows water or other fluid to pass therethrough. For instance, when water seeps through grout or mortar over the tileable flap 134 of the at least one fabric layer 130, the weep structure of the tileable flap 134 can permit the water to weep through the tileable flap 134 and onto the lateral flange 114 of the drain fixture 102, which, in turn, directs the water toward the drain opening 112.

According to another embodiment shown in FIG. 3A, a layer 115 of sealant such as rubber urethane may be applied below the tileable flap 134 that is impermeable to prevent water from weeping out a lower surface of the tileable flap 134. The tileable flap 134 can include a weeping configuration or weep structure that allows water to pass through the upper surface of the tileable flap 134 and then weep along a length of the tileable flap 134 within a thickness of the at least one fabric layer 130 toward the drain opening 112. According to a variation, a region of the tileable flap 134 toward the wall portion 118 can be open or unsealed such that water can weep out of the tileable flap 134 below the wall portion 118 and flow toward the drain opening 112. It should be appreciated that at least a portion of the at least one fabric layer 130 can have a hydrophilic configuration. For instance, the tileable flap 134 can include matte surfacing to break surface tension of fluids, allowing for a wicking effect. In other embodiments, the tileable flap can include a textured portion defining a hydrophilic surface that attracts and retains moisture in flow channels defined through the at least one fabric layer 130.

According to another variation, at least a lower part of the wall portion 118 can be arranged so that water can weep through the wall portion 118 and flow toward the drain opening 112. For instance, the lower part of the wall portion 118 incorporating the at least one fabric layer 130 can include a weep structure configured to allow water or other fluid to weep through the lower part of the wall portion 118. In other embodiments, the lower part of the wall portion 118 can include a plurality of openings, recesses, or apertures configured to allow water or other fluid to weep through the lower part of the wall portion 118.

Referring again to FIG. 3, the support frame 106 has a height H defined between the bottom and upper surfaces of the support frame 106 that is arranged to be shorter than existing drain systems and thus makes the support frame relatively low-profile compared to existing drain systems. For instance, the height H of the support frame 106 can generally correspond to the thickness of a tile and/or the thickness of the tile plus a substrate material attaching the tile to a base.

In addition, the support frame 106 is configured to not extend downwardly into the drain opening 112 such that a tile installer can float or freely move the support frame 106 over the top of the drain opening 112 on the upper surface 110 of the drain fixture 102 as installation requires. This floating configuration of the support frame 106 over the drain opening 112 allows for lateral adjustment and rotational adjustment of the support frame 106 relative to the drain opening 112 for optimized fit and decreased complexity of installation. For instance, the support frame 106 can be aligned or squared to a dominate wall or surrounding tiles up until when the nearest tiles are installed adjacent the support frame, streamlining installation and improving the aesthetics of the finished tile floor. This is advantageous over prior art drain systems including a square riser or drain head that must be squared to a dominate wall and immobilized prior to the actual tile installation, often resulting in undesired and unpleasant misalignments between a drain cover of the drain system and installed tiles, and precluding the ability to correct such misalignments.

As illustrated with FIGS. 4A-4C, the floating configuration of the support frame 106 allows for a degree of misalignment between the opening 124 of the support frame 106 and the drain opening 112 in various positions, which, in turn, allows the support frame 106 to accommodate different conditions that may present themselves during a tile installation. For instance, the position of the support frame 106 over the drain opening 112 can be moved between a first position shown in FIG. 4A, a second position shown in FIG. 4B, and a third position shown in FIG. 4C. This beneficially allows the position of the support frame 106 over the drain opening 112 to be adjusted as needed such as required due to the presence of a wall extending over the drain fixture 102, and/or to accommodate tile anomalies or other undesirable conditions.

The floating configuration of the support frame 106 also allows the support frame 106 to be compatible with several different drain components. For instance, the support frame 106 can be used in a retrofit application. If a drain installation includes a floor that is already tiled, an installer can simply apply a bonding agent to the support frame 106 and selectively position the support frame 106 over the existing drain opening and then tile right over the existing tile floor up to the support frame 106. This substantially decreases the time required to install the drain system when compared to other drain systems that require demolition and/or complicated tie ins to an existing drain fixture below the existing tile floor.

Figure 5:
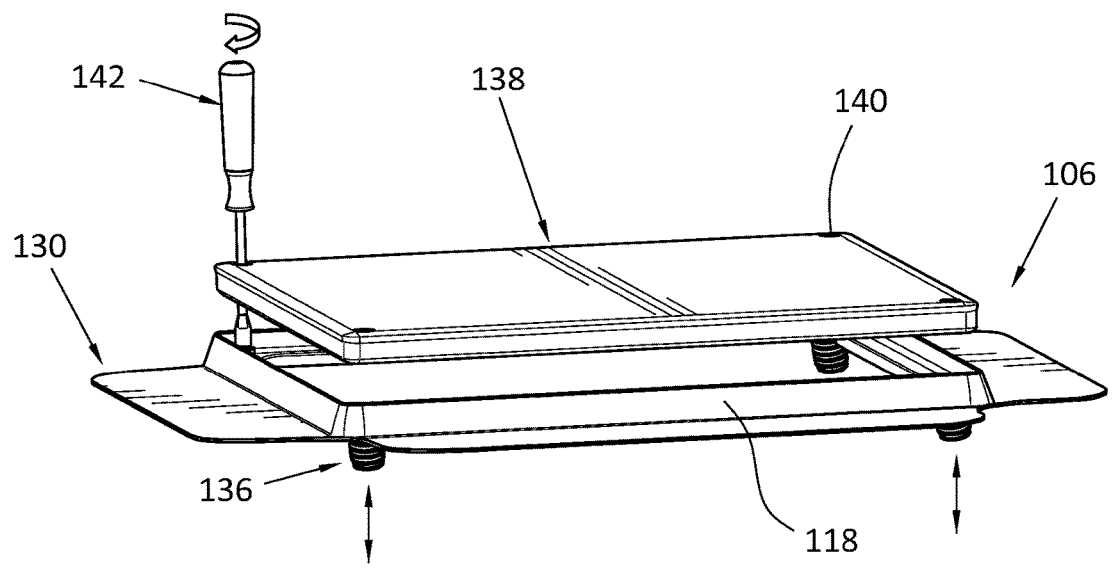
FIG. 5 is a top perspective view of the support frame of FIG. 1 and a construction plug according to an embodiment.

Referring now to FIG. 5, the support frame 106 can be adjustable in vertical position and/or pitch or angle relative to the drain fixture 102. This beneficially helps ensure that the height and/or angle of the support frame 106 better matches that of surrounding tiles at the junction between the support frame 106 and the tiles, improving the look and function of the drain system 100. For instance, the threaded holes 126 in the base portion 116 can receive one or more set screws 136 having lower ends arranged to engage the upper surface 110 of the drain fixture 102. The one or more set screws 136 can be arranged to support on, but do not attach the support frame 106 to the drain fixture 102. The one or more set screws 136 are sufficiently rigid such that they at least in part support the support frame 106 on the drain fixture 102 outside of the drain opening 112. They can thus provide stability at the level they are set to until mortar surrounding the support frame 106 solidifies.

The one or more set screws 136 can be rotated in the threaded holes 126 to raise and/or lower the support frame 106 relative to the upper surface 110 of the drain fixture 102. FIG. 5 illustrates an exemplary system for adjusting the vertical position and/or angle of the support frame 106 on the upper surface 110 of the drain fixture 102. The drain cover 104 is interchangeable with another drain cover comprising a construction plug 138 positionable in the opening 124 of the support frame 106 during a tile floor installation. The construction plug 138 can be temporary and have an upper surface having a solid or continuous or substantially continuous configuration arranged to prevent mortar and other debris from entering the drain opening 112 when the construction plug 138 is positioned on the support frame 106.

The construction plug 138 also can reinforce the wall portion 118 against radially inward movement when the construction plug 138 is positioned on the support frame 106. This has the effect of helping to prevent the wall portion 118 of the support frame 106 from being deformed by tiles forcing themselves against the tile-facing surface 120 of the wall portion 118 during an installation. The construction plug 138 can thus help the support frame 106 maintain its shape to properly receive the drain cover 104 (e.g. a drain grate) after a tile installation is complete.

In the illustrated embodiment, the construction plug 138 includes a plurality of access holes 140 corresponding to the threaded holes 126 in the base portion 116. This beneficially allows the one or more set screws 136 to be accessed through the construction plug 138 when the construction plug 138 is positioned in the support frame 106.

With the construction plug 138 installed in the support frame 106, a small amount of mortar can be applied over the tileable flap 134 of the at least one fabric layer 130. A leveler can then be positioned on top of the support frame 106 to determine how level the support frame 106 is relative to horizontal. The upper surface of the construction plug 138 is arranged to be flush or substantially flush with the upper surface of the wall portion 118 when the construction plug 138 is installed on the support frame 106. This allows the upper surface of the construction plug 138 to provide a reference to help determine when the support frame 106 is level or at a desired angle.

It will be appreciated that the one or more set screws 136 can include a tool connectable portion adapted to receive a screwdriver 142 or other tool to rotate the one or more set screws 136 or resist rotation as needed. An installer can selectively insert the screwdriver 142 through the access holes 140 in the construction plug 138 to access and rotate the one or more set screws 136 as needed to level the support frame 106 relative to horizontal before the mortar on the tileable flap 134 sets. Once the mortar is set, the construction plug 138 can be removed and any space defined between the bottom of the base portion 116 and the bottom of the one or more set screws 136 can be filled with grout and/or another material to reinforce the base portion 116 against collapsing or bending during use, such as when a person steps on the drain cover 104.

In other embodiments, the one or more set screws 136 can be selectively rotated in the threaded holes 126 to adjust the vertical position or height of the support frame 106 relative to the upper surface 110 of the drain fixture 102 based on a thickness of specific tiles surrounding the support frame 106. For instance, if the tiles surrounding the support frame 106 have a thickness of ¼ inch, the one or more set screws 136 can be manipulated to adjust the vertical position or height of the upper surface of the wall portion 118 of the support frame 106 to match or correspond to that of the tiles. As the height of the support frame 106 is adjusted, the tileable flap 134 of the at least one fabric layer 130 can drop or hang down to the underlying surface, bridging a distance between the support frame 106 and the underlying surface.

The low-profile bondable configuration of the support frame 106 can allow the drain system 100 to be easily positioned relative to an existing drain, a new drain, a floor, a wall, or any other position that installation requires.

In one exemplary installation process related to installing the drain system 100 in a tiled floor, the drain fixture 102 can be placed in position relative to an underlying base. In placing the drain fixture 102, the drain opening 112 can be attached to a drainpipe or other underdrain structure, and the support frame 106 carrying the construction plug 138 can be positioned over the drain opening 112. Formwork is placed and secured to the underlying base.

Once the drain fixture 102 is placed, a mortar can then be applied to the underlying base to form a mortar bed up to the upper surface 110 of the drain fixture 102, forming the appropriate slope towards the drain opening 112. It will be appreciated that a mortar bed is exemplary only, and other possible beds exists. Optionally, a shower pan can be placed between the mortar bed and the underlying base.

Thinset mortar can be spread over the top of the mortar bed and the tileable flap 134 of the at least one fabric layer 130, and floor tiles can be set in the thinset mortar. The thinset mortar can be applied such that a small gap remains between the support frame 106 and the thinset mortar. As discussed above, openings in the structure of the at least one fabric layer 130 beneficially allow the thinset mortar to form a mechanical or micromechanical lock with the tileable flap 134, tying the support frame 106 and the thinset mortar together. As the thinset mortar dries, the vertical position and/or angle of the support frame 106 can be adjusted via the access holes 140 formed in the construction plug 138, if needed, such that the set tiles are flush or substantially flush with the upper surface of the construction plug 138. In addition, the lateral and/or rotational position of the support frame 106 can be adjusted relative to the set tiles as needed to create a smoother transition between the tiles and the support frame 106.

Once the thinset mortar is dried, the set tiles can be grouted with the construction plug 138 in place. As discussed above, openings in the structure of the at least one fabric layer 130 allow the grout to form a mechanical or micromechanical lock to the first part 132 of the at least one fabric layer 130. This has the effect of enhancing retention of the grout between the support frame 106 and the surrounding tiles, helping to convey water toward the drain opening 112, and helping to retain the drain system 100, the support frame 106, and the tiles in their desired configuration.

After grouting, the construction plug 138 can be removed and a filler material such as grout, mortar, and/or other material can be applied below the base portion 116 to help reinforce the support frame 106 against collapsing or bending during use, such as when a person steps on the drain cover 104. As discussed above, the slots 128 can help the filler material lock with the base portion 116. In addition, the filler material can bond with the tileable flap 134, helping to keep the filler material in place below the base portion 116. After the filler material has dried, the installer can position the drain cover 104 in the support frame 106 and the drain system 100 is ready for use. The drain cover 104 and the construction plug 138 are sized and configured so that when the construction plug 138 is removed and the drain cover is installed in the support frame 106, the upper surfaces of the drain cover 104 and the set tiles are substantially flush or flush with one another, enhancing the aesthetics and hydraulic properties of the drain system 100.

The drain system 100 can thus allow for easier and faster installation of tile floors that are more appealing than existing systems and which exhibit improved hydraulic properties. In other embodiments, the drain system 100 can be positioned over an existing drain in a tiled floor and new tiles can be installed over the existing tiles such that new tiles when set are flush or substantially flush with the upper surface of the construction plug 138. As such, when the construction plug is removed and the drain cover 104 is installed in the support frame 106, the upper surfaces of the drain cover 104 and the new tiles are substantially flush or flush with one another.

Figure 6:
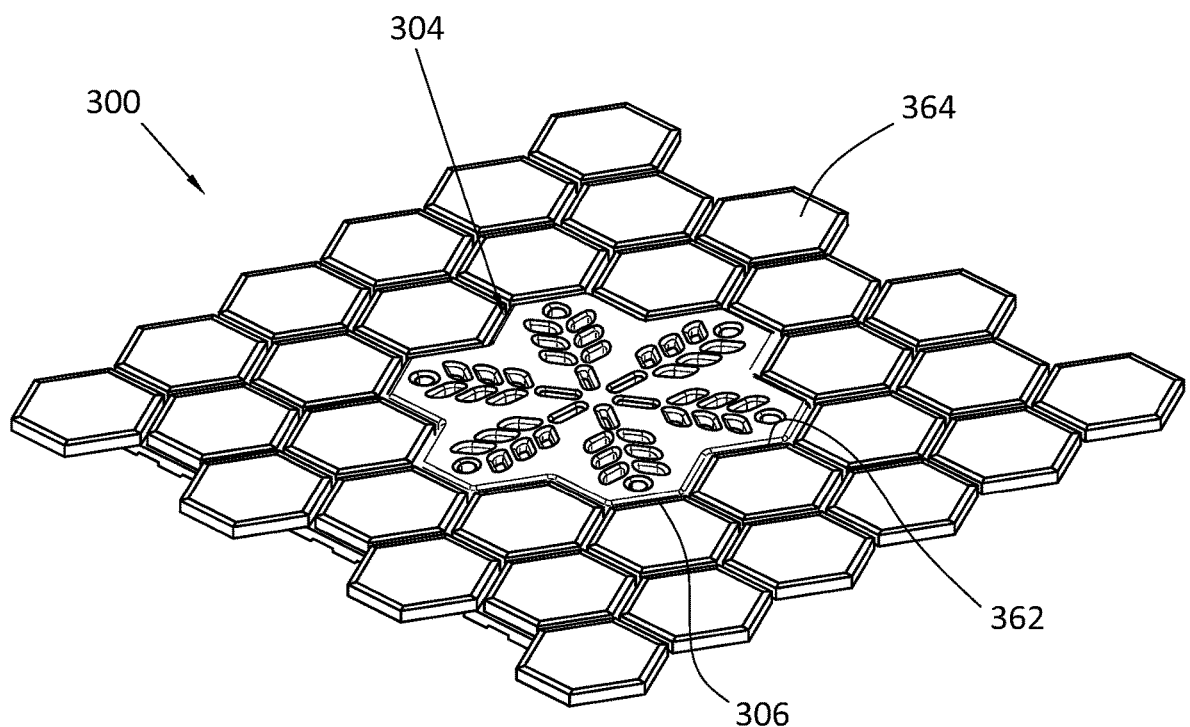
FIG. 6 is a top perspective view of a tiling system including a drain system and a drain cover according to another embodiment.
Figure 7:
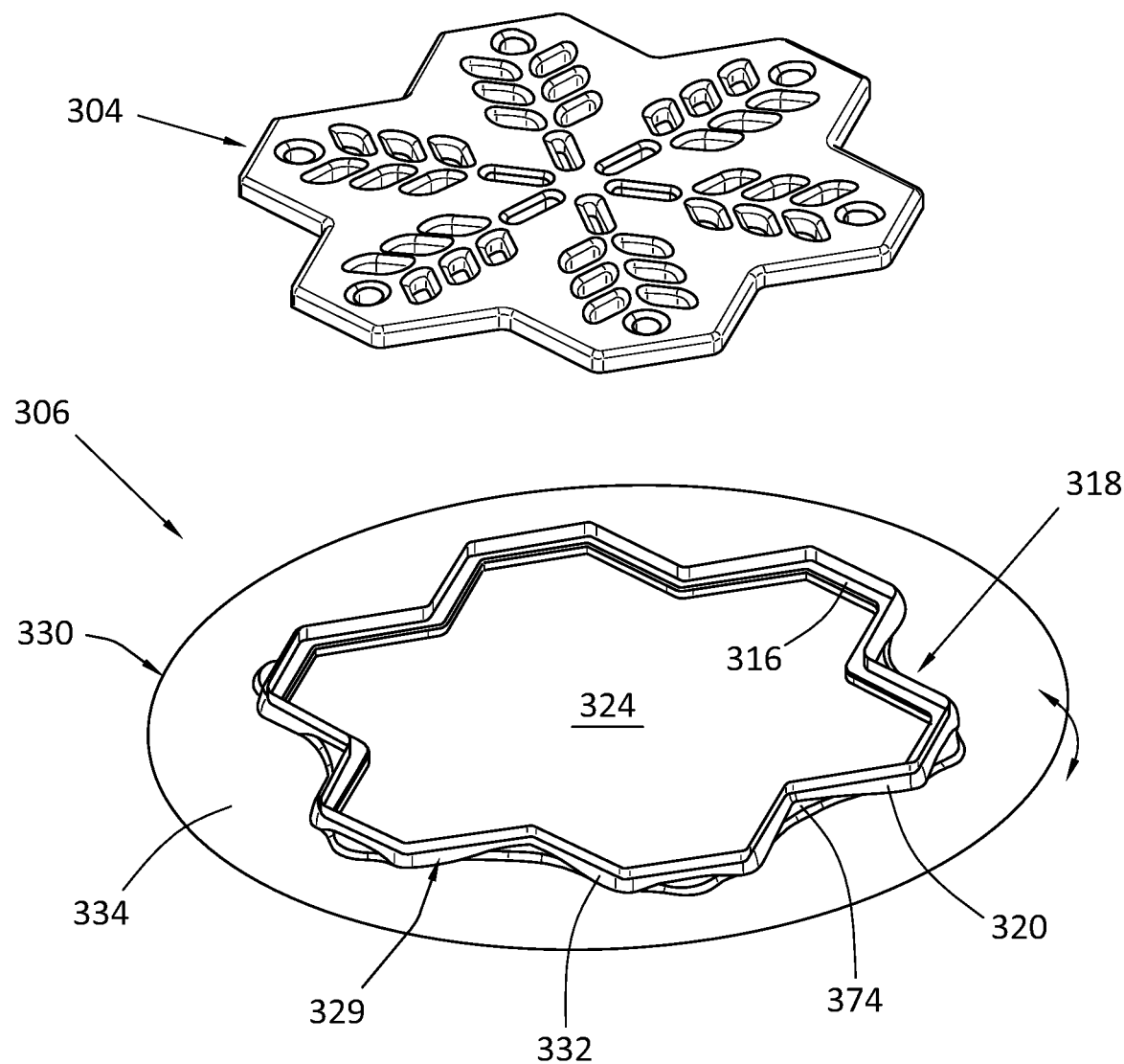
FIG. 7 is a top exploded view of the support frame and the drain cover in FIG. 6 according to an embodiment.

FIGS. 6 and 7 illustrated yet another embodiment of a drain system 300 including a drain cover 304 and a support frame 306. It will be appreciated that the drain system 300 can include the same or similar features as the other embodiments described herein. For instance, the drain cover 304 can comprise a drain grate that is perforated to allow for water to drain therethrough. Like other embodiments, it will be appreciated that the drain cover 304 can be interchangeable with a construction plug arranged for use during a tile floor installation.

The support frame 306 comprises a molded plastic member having a hexagonal shape arranged to fit or mate within a hexagonal opening 362 defined by a plurality of hexagonal tiles 364 surrounding the support frame 306. This allows the drain system 300 to be substantially seamlessly or seamlessly installed in a hexagonal pattern tile floor without having to cut the tiles to fit against the drain as in existing systems. The inner peripheral shape of the support frame 306 can also have a hexagonal shape arranged to receive the drain cover 304 having a corresponding hexagonal shape. While the support frame 306 is described having similar inner and outer peripheral shapes, in other embodiments, the support frame 306 can have an outer peripheral shape that is different than its inner peripheral shape. In other embodiments, the support frame 306 can be formed of metal or any other suitable material.

Like in other embodiments, the support frame 306 includes a base portion 316 and a wall portion 318 projecting upwardly from the base portion 316. The base portion 316 extends radially inward from a lower end portion of the wall portion 318 and defines an opening 324 in communication with a drain opening of a drain fixture. The base portion 316 and the wall portion 318 define a seat for the drain cover 304 within the support frame 306 such that the support frame 306 can support and position the drain cover 304 within a tile floor.

As in previous embodiments, the support frame 306 includes one or more material locking features 329 comprising at least one fabric layer 330 extending along a tile-facing surface 320 of the wall portion 318. The direct connection between the at least one fabric layer 330 and the support frame 306 can be limited to a vertically extending portion of the tile-facing surface 320 of the wall portion 318. The at least one fabric layer 330 provides continuity between the support frame 306 and adjacent tiles. The at least one fabric layer 330 also creates mechanical or micromechanical bonds between the support frame 306 and grout, or other material applied to the at least one fabric layer 330. This beneficially helps limit separation between the support frame 306 and the surrounding tiles over time, improving aesthetics of the drain system 300 and conveying water toward the drain opening.

The at least one fabric layer 330 includes a first part 332 integrally molded into the tile-facing surface 320 of the wall portion 318, and a tileable flap 334 that is movable or foldable relative to a connection between the at least one fabric layer 330 and a bottom of the support frame 306. The tileable flap 334 can extend entirely or partially around the outer periphery of the wall portion 318. The tileable flap 334 has a circular shape in the illustrated embodiment but can have any suitable shape.

In the illustrated embodiment, the outer periphery of the support frame 306 includes one or more web portions 374 extending between angles formed in the wall portion 318. The one or more web portions 374 can be sized and configured to level or align top surfaces of tiles adjacent to the support frame 306 with the top of the support frame 306. For instance, a height of the wall portion 318 between the top of the support frame 306 and the top of the one or more web portions 374 can be tied to thicknesses of specific tiles such that when that tile is positioned on the one or more web portions 374, the top of the tile is substantially flush or flush with the top of the support frame 306.

As such, the support frame 306 can be manufactured to fit different tile thicknesses to enhance the transition between the support frame and adjacent tiles. The support frame 306 and the one or more web portions 374, for example, can be manufactured to help level tiles that are about ⅛-inch-thick, about ¼-inch-thick, about ⅜ inch-thick, or about ½ inch thick. In other embodiments, the support frame 306 can be adapted to work with tiles that are thicker or thinner.

Figure 8:
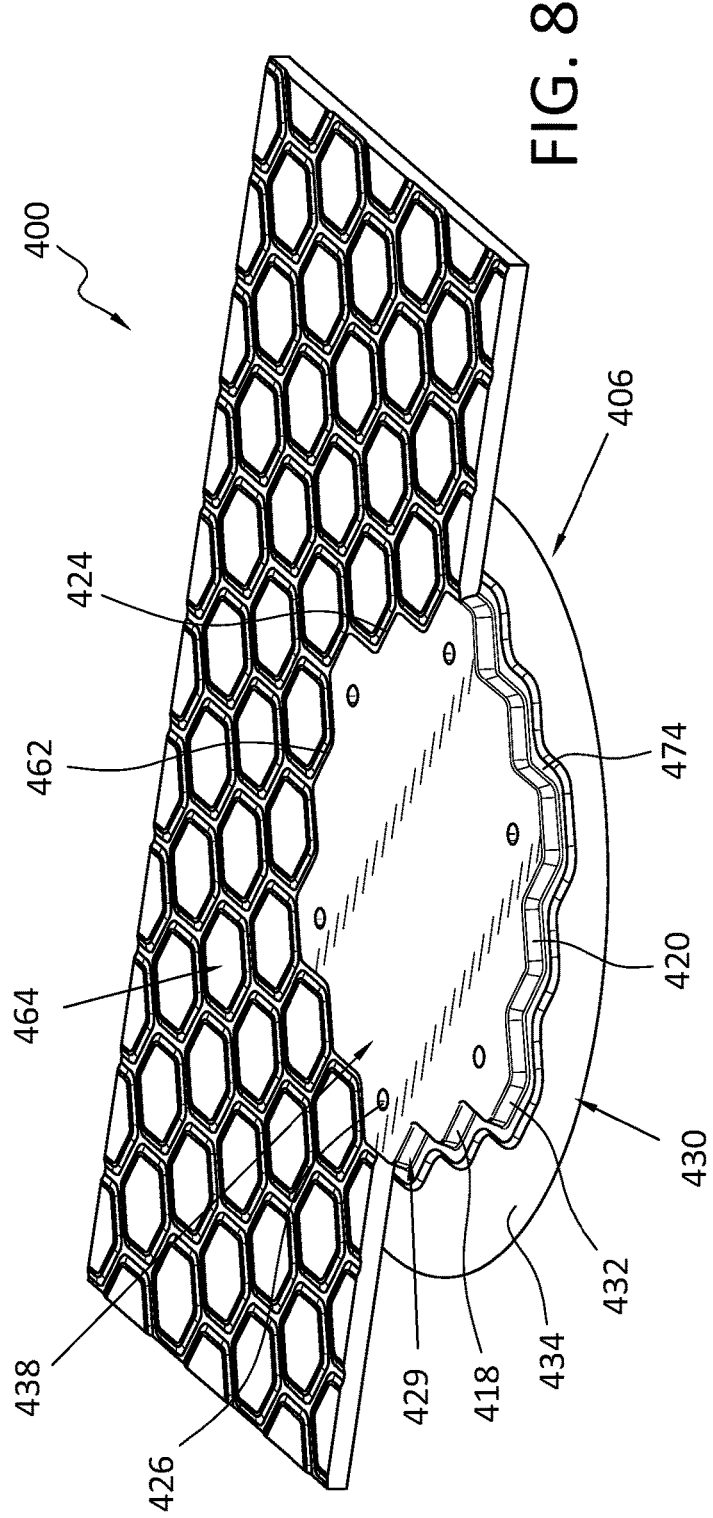
FIG. 8 is a top perspective view of a tiling system including a drain system and a drain cover comprising a construction plug according to an embodiment.
Figure 9:
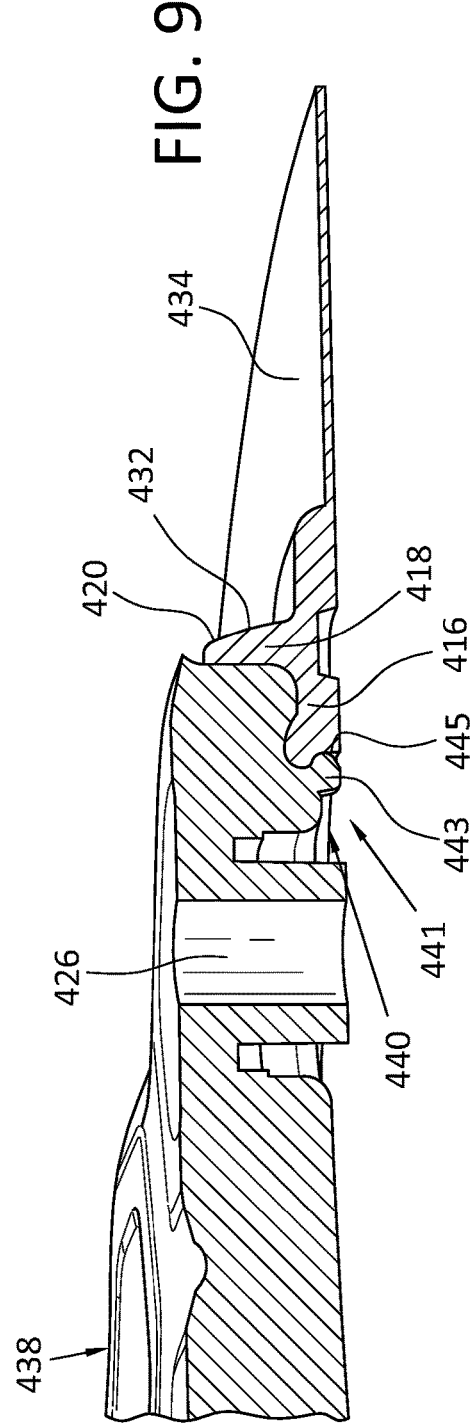
FIG. 9 is a side cross section view of the drain system in FIG. 8.
Figure 10:
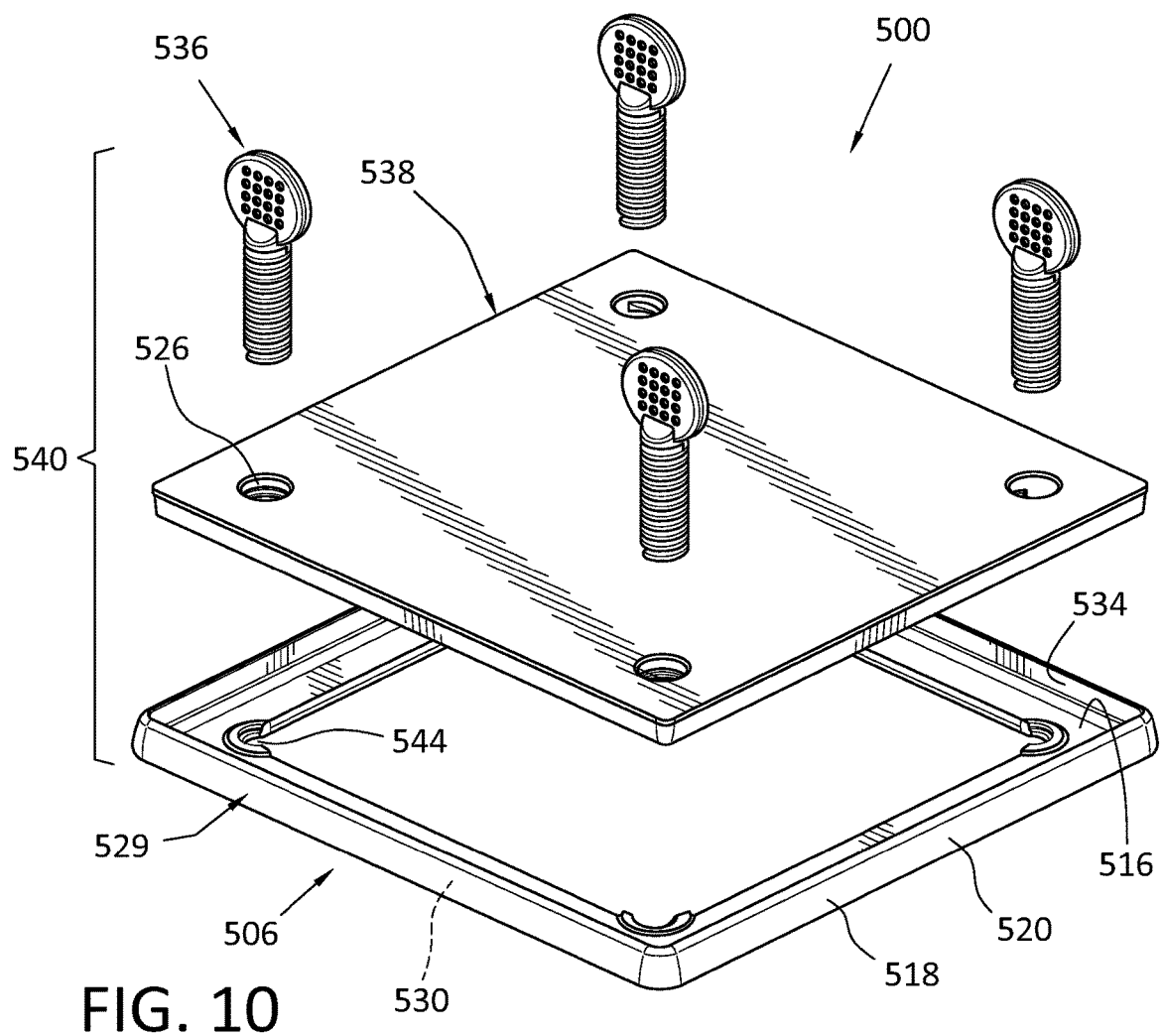
FIG. 10 is an exploded view of a drain system according to another embodiment.
Figure 11:
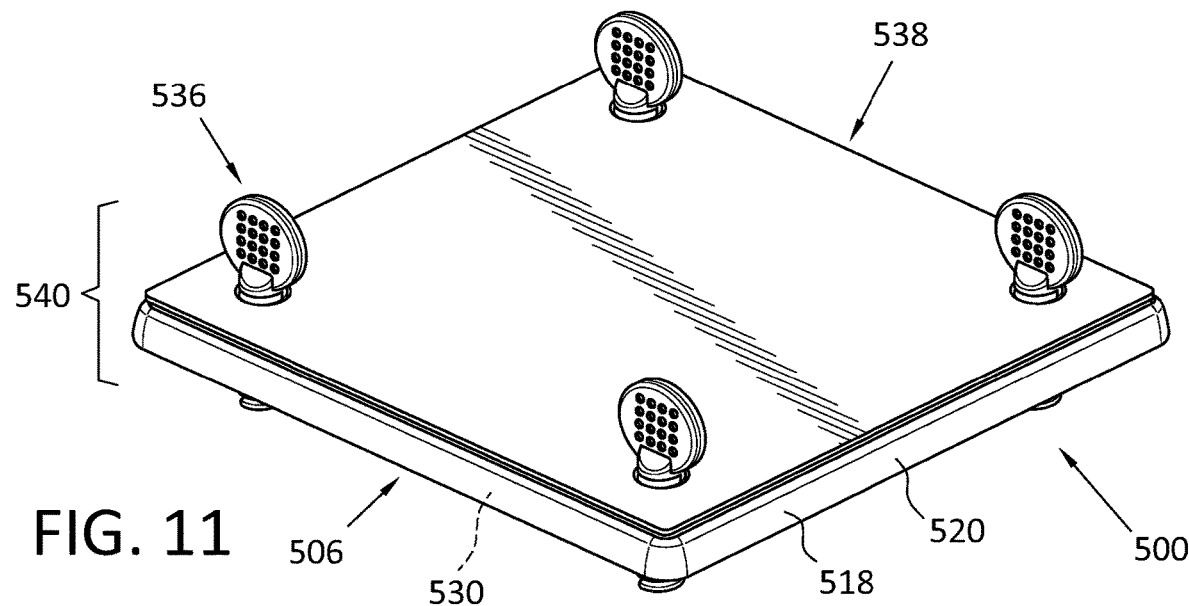
FIG. 11 is a side perspective view of the drain system in FIG. 10.

FIGS. 8 and 9 illustrates yet another embodiment of a drain system 400 including a support frame 406 configured to support and position a drain cover over a drain opening in a tile floor. It will be appreciated that the drain system 400 can include the same or similar features as the other embodiments described herein. The support frame 406 is shown having a honeycomb shape arranged to fit or mate within a honeycomb shaped opening 462 defined by a plurality of hexagonal tiles 464 surrounding the support frame 406. This allows the drain system 400 to be substantially seamlessly or seamlessly installed in a hexagonal pattern tile floor without having to cut the tiles 464 to fit against the drain as in existing systems. The inner peripheral shape of the support frame 406 can also have a honeycomb shape arranged to receive a drain cover comprising a perforated drain grate or a construction plug 438 having a corresponding shape.

Like the previous embodiments, the support frame 406 includes a base portion 416 and a wall portion 418 projecting upwardly from the base portion 416. The base portion 416 extends radially inward from a lower end portion of the wall portion 418 and defines an opening in communication with a drain opening of a drain fixture. The base portion 416 and the wall portion 418 define a seat for the drain cover within the support frame 406 such that the support frame 406 can support and position the drain cover within a tile floor.

In the illustrated embodiment, a flange 474 extends circumferentially and radially outward from the wall portion 418. The flange 474 can be sized and configured to level or align the top surface of tiles adjacent to the support frame 406 with the top of the support frame 406. For example, a height of the wall portion 418 between the top of the support frame 406 and the top of the flange 474 can be tied to thicknesses of specific tiles such that when the tile is positioned on the flange 474, the top of the tile is substantially flush or flush with the top of the support frame 406.

Like in other embodiments, at least the tile-facing surface 420 includes one or more material locking features 429 configured to improve a connection between the support frame 406 and surrounding tiles 464. The one or more material locking features 429 can comprise at least one fabric layer 430 extending along a tile-facing surface 420 of the wall portion 418. The direct connection between the at least one fabric layer 430 and the support frame 406 can be limited to a vertically extending portion of the tile-facing surface 420 of the wall portion 418. As in previous embodiments, the at least one fabric layer 430 provides continuity between the support frame 406 and the surrounding tiles 464. The at least one fabric layer 430 also creates mechanical or micromechanical bonds between the support frame 406 and grout, or another material applied to the at least one fabric layer 430. This beneficially helps limit undesirable separation between the support frame 406 and the surrounding tiles over time and improving aesthetics of the drain system 400.

The at least one fabric layer 430 can include a first part 432 integrally molded into the tile-facing surface 420 of the wall portion 418, and a tileable flap 434 that is movable or foldable relative to a connection between the at least one fabric layer 330 and a bottom of the support frame 406. In other embodiments, the tileable flap 434 can be omitted.

The support frame 406 can be adjustable in vertical position and/or pitch relative to an underlying drain fixture, helping to ensure that the height and/or angle of the support frame 406 better matches that of surrounding tiles 464 at the junction between the support frame 406 and the tiles 464, improving the look and function of the drain system 400. For instance, the construction plug 438 is provided to be positioned in the opening 424 of the support frame 406. The construction plug 438 has an upper surface having a continuous or substantially continuous configuration arranged to prevent mortar and other debris from entering a drain opening of a drain fixture when the construction plug 438 is positioned on the support frame 406.

According to a variation, a locking system 440 selectively locks the construction plug 438 and the support frame 406 together. This allows the construction plug 438 and the support frame 406 to move together when the construction plug 438 is coupled to the support frame 406, which also can advantageously allow for adjustment of the vertical position or the height and/or angle of the support frame 406 relative to an upper surface of an underlying drain fixture or other underlying surface during a tile floor installation.

In an embodiment, the locking system 440 can include one or more snap lock features 441 that reversibly attach the construction plug 438 to the support frame 406 when the construction plug 438 is positioned on the support frame 406. For instance, the one or more snap lock features 441 can comprise a plurality of hook portions 443 defined on the construction plug 438 that interact with a one or more recesses 445 defined on the base portion 416 to hook the construction plug 438 to the support frame 406 at three, four, five, six, or any other number of suitable locations. In other embodiments, the one or more snap lock features 44' can include male features defined by the construction plug 438 and corresponding female features defined by the support frame 406 or vice versa.

To remove the construction plug 438 from the support frame 406, a force can be applied to the construction plug 438 that overcomes the engagement between the one or more snap lock features 44'. It will be appreciated that the size, number, and configuration of the one or more snap lock features 44' can be adjusted to vary the strength of the snap fit as needed. The one or more snap lock features 44' are preferably configured so that the force required to remove the construction plug 438 from the support frame 406 is less than the force required to move the support frame 406 when it is set in mortar or other binding material. Therefore, when an installer lifts the construction plug 438 away from the support frame 406, the support frame 406 remains set in the mortar but detaches from the construction plug 438.

In an embodiment, the construction plug 438 can include a plurality of threaded holes 426 configured to receive one or more set screws having lower ends arranged to engage an upper surface of a drain fixture or other underlying surface. The set screws can be arranged to support the support frame 406 and the construction plug 438 but not attach them to the drain fixture. The set screws can be rotated in the threaded holes 426 to raise, lower, and/or angle the support frame 406 and the construction plug 438 relative to the upper surface of the drain fixture. The threaded holes 426 are preferably positioned such that the set screws locate radially inside of the base portion 416 or separate from the structure of the support frame 406 when inserted in the threaded holes 426. In other embodiments, the threaded holes 426 can be aligned with corresponding threaded holes in the base portion 416 such that the set screws can both level and attach the support frame 406 and the construction plug 438 together, allowing for the snap-fit between the two components to be adjusted or omitted.

In use, a small amount of mortar can be applied around the support frame 406 with the construction plug 438 installed in the support frame 406. For instance, the mortar can be applied over the tileable flap 434 of the at least one fabric layer 430. A leveler can then be positioned on top of the support frame 406 to determine how level the support frame 406 is relative to horizontal. An installer can then insert a screwdriver or other tool through the through the threaded holes 426 in the construction plug 438 to access and selectively rotate one or more of the set screws to level and/or adjust the height of the support frame 406 as needed before the mortar surrounding the support frame 406 is set.

Once the mortar is set, the set tiles 464 can be grouted with the construction plug 438 in place. As discussed above, openings in the structure of the at least one fabric layer 430 allow the grout to form a mechanical or micromechanical lock to the at least one fabric layer 430. This has the effect of better retaining the grout between the support frame 406 and the surrounding tiles 464, helping to direct water flow off the tiles toward a drain cover, and helping to retain the drain system 400, the support frame 406, and the tiles in their desired configuration.

After grouting, the construction plug 438 can be removed. To remove the construction plug 438, a separating force can be applied to the construction plug 438 to break the snap-fit between the construction plug 438 and the support frame 406 now set in the mortar, which, in turn, allows the construction plug 438 and the set screws to be removed from the support frame 406. Optionally, a filler material such as grout, mortar, and/or other material can then be applied below the base portion 416 to help reinforce the support frame 406 against collapsing or bending during use, such as when the drain cover is loaded (e.g., a person steps on the drain cover).

The installer can then position a drain cover having a perforated configuration in the support frame 406 and the drain system 400 is ready for use. The drain cover and the construction plug 438 can be sized and configured so that when the construction plug 438 is removed and the drain cover is installed in the support frame 406, the upper surfaces of the drain cover and the set tiles are substantially flush or flush with one another, enhancing the aesthetics and hydraulic properties of the drain system 400. The drain system 400 can thus allow for easier and faster installation of tile floors that are more appealing than existing systems and which exhibit improved hydraulic properties.

While the locking system 440 is described as a snap-lock system with hook members, it will be appreciated that in other embodiments the locking system can comprise any suitable coupling means such as an annular snap-fit, a cantilever snap-fit, a torsional snap-fit, a threaded connection, an adhesive attachment, or any other suitable type of reversible attachment.

FIGS. 10-19 illustrate yet another embodiment of a drain system 500 including a support frame 506 configured to support and position a drain cover over a drain opening in a tile floor. It will be appreciated that the drain system 500 can include the same or similar features as other embodiments described herein. The drain cover can be a construction plug 538 (shown in FIGS. 10-14) and/or a drain cover 504 (shown in FIG. 15). Like in other embodiments, the support frame 506 can be floatable over the drain opening for lateral and/or rotational adjustment of the support frame 506 relative to the drain opening. The floating configuration of the support frame 106 allows for optimized fit and decreased complexity of installation. For instance, the support frame 506 can be aligned or squared to a dominate wall or other benchmark such as surrounding tiles up until when tiles are installed adjacent the support frame, streamlining installation and improving the aesthetics of the finished tile floor. This is advantageous over prior art drain systems that require a square riser or drain head of the drain system to be squared to a dominate wall and immobilized prior to the actual tile installation, often resulting in undesired and unpleasant misalignments between the drain system and installed tiles, and precluding the ability to correct such misalignments.

The support frame 506 includes a base portion 516 and a wall portion 518 projecting upwardly from the base portion 516. The base portion 516 extends radially inward from a lower end portion of the wall portion 518 and defines an opening in communication with the drain opening of a drain fixture. The base portion 516 and the wall portion 518 define a seat for the drain cover within the support frame 506 such that the support frame 506 can support and position the drain cover within a tile floor. The wall portion 518 can define a cover-facing surface 534 arranged to interface with the drain cover, and a tile-facing surface 520 arranged to face tiles and/or grouting material surrounding the support frame 506. The support frame 506 can be formed of ABS plastic or any other suitable material. Further, the support frame 506 may be provided in different sizes such as a 4-inch and 5-inch support frame 506.

At least the tile-facing surface 520 includes one or more material locking features 529 configured to enhance a connection between the support frame 506 and surrounding tiles. In an embodiment, the one or more material locking features 529 comprise at least one fabric layer 530 extending along at least part of the tile-facing surface 520. The at least one fabric layer 530 can provide a smooth transition between the support frame 506 and adjacent tiles and can help create mechanical or micromechanical bonds between the support frame 506 and grout, or other material applied to the at least one fabric layer 530. This beneficially helps limit separation between the support frame 506 and the surrounding tiles during installation or over time.

According to a variation, the at least one fabric layer 530 can be integrally molded or otherwise attached onto the tile-facing surface 520 and a bottom surface of the base portion 516. For instance, the at least one fabric layer 530 can wrap around from the tile-facing surface 520 onto the bottom surface of the base portion 516. In an embodiment, the at least one fabric layer 530 terminates short of threads or cutouts defined on the base portion 516 as described below. In an embodiment, the at least one fabric layer 530 may be omitted from the upper surface of the base portion 516. In an embodiment, the at least one fabric layer 530 can comprise a Polyethylene (PE) fabric or any other suitable fabric.

The construction plug 538 can have an upper surface having a continuous or substantially continuous configuration arranged to prevent mortar and other debris from entering the drain opening when the construction plug 538 is positioned on the support frame 506. The construction plug 538 also can reinforce the wall portion 518 against radially inward movement when the construction plug 538 is positioned on the support frame 506. This has the effect of helping to prevent the wall portion 518 of the support frame 506 from being deformed by tiles forcing themselves against the tile-facing surface 520 of the wall portion 518 during an installation. The construction plug 538 can thus help the support frame 506 maintain its shape to properly receive the drain cover (e.g. a drain grate) after a tile installation is complete.

Like the previous embodiment, a locking system 540 can selectively and temporarily lock the construction plug 538 and the support frame 506 together. This helps prevent unintentional removal of the construction plug 538 from the support frame 506 during an installation, increasing protection of the underlying drain fixture. It also allows the construction plug 538 and the support frame 506 to move together when the construction plug 538 is coupled to the support frame 506, which also can advantageously allow for adjustment of a vertical position or height and/or angle of the support frame 506 relative to an upper surface 510 of an underlying drain fixture 502 or other underlying surface during a tile floor installation.

In the illustrated embodiment, the locking system 540 includes a plurality of fasteners or set screws 536, a first plurality of openings 526 defined in the construction plug 538, and a second plurality of openings 544 defined in the base portion 516. The first openings 526 in the construction plug 538 align with the second openings 544 in the base portion 516 when the construction plug 538 is positioned on the support frame 506. The set screws 536 have lower ends arranged to engage an upper surface of a drain fixture 502 (shown in FIG. 14) or another underlying surface. The set screws 536 are shown including enlarged, flattened head portions arranged to facilitate manual rotation but can include any suitable head configuration.

Referring to FIG. 12, the second openings 544 can comprise cutouts 546 in corner areas or areas where two or more sides of the support frame 506 meet. Each cutout 546 forms an arcuate or incomplete circular shape and defines at least one thread 548 having a partial configuration arranged to mesh with the threads on the set screws 536. The at least one thread 548 can include one, two, or any suitable number of threads. Referring to FIG. 13, the first openings 526 can comprise through holes 550 formed in corner areas or areas where two or more sides of the construction plug 538 come together. Each through hole 550 has a circular cross section and defines at least one thread 552 having a partial circumferential configuration arranged to threadedly engage the set screws 536. The at least one thread 552 can comprise one, two, three, or any other suitable number of threads.

The threads 552 are also be arranged to cooperate with the threads 548 on the base portion 516 such that the support frame 506 and construction plug 538 are held together as the set screw 536 is threaded into and out of the first and second openings 526, 544. In an embodiment, the threads 548, 552 can have a common thread geometry and clocking to help ensure proper alignment and function regardless of the support frame 506 and the construction plug 538 being randomly rotated and assembled.

As seen in FIG. 13, the threads 552 can be circumferentially and vertically offset relative to the threads 548 in the second openings 544. This can help locate both threads on a same thread or helical path configured to mesh with the set screws 536 and lock the support frame 506 and the construction plug 538 together. The circumferential offset of the threads also can improve the strength of the threaded connection between the support frame 506 and the construction plug 538 by anchoring the support frame 506 and the construction plug 538 to opposing sides of the set screws 536.

While the threads 548, 552 are described and shown as partial threads, in other embodiments, it will be appreciated the threads 548 can be partial and/or fully helical. For instance, in an embodiment, the threaded openings 526 in the support frame 506 can be offset radially outward in the base portion 516 such that the cutouts are circular holes in the base portion 516 and the threads 548 can extend completely or partially around the holes. The combination of the second openings 544 and the cutouts 546 beneficially help maintain the longitudinal alignment of the set screws 536 relative to the construction plug 538 and the support frame 506 and reduce production costs.

In use, a small amount of mortar can be applied around and/or below the support frame 506 with the construction plug 538 installed in the support frame 506 and the set screws 536 coupling the construction plug 538 to the support frame 506. A leveler can then be positioned on top of the support frame 506 to determine how level the support frame 506 is relative to horizontal.

An installer can then use fingers or a tool to selectively rotate one or more of the set screws 536 in the openings 526, 544 to level, angle, and/or adjust the height of the support frame 506 and the construction plug 538 as needed before the mortar surrounding and/or supporting the support frame 506 is set. Referring to FIG. 14, the set screws 536 support on, but do not attach the support frame 506 to the drain fixture 502.

As discussed above, the threads 548, 552 are arranged so that the construction plug 538 and the support frame 506 are held together as they move up and down the threads of the set screws 536. This allows the installer to selectively rotate one or more of the set screws 536 to tilt, raise and/or lower the support frame 506 relative to the upper surface 510 of the drain fixture 502. For instance, the installer can rotate all the set screws 536 together to raise or lower the entire support frame 506. Alternatively, the installer can rotate two of the set screws 536 along one side of the support frame 506 to raise or lower that side relative to the opposite side, angling the support frame 506. Alternatively, the installer can rotate one of the set screws 536 to raise or lower one region relative to the other regions of the support frame 506. The set screws 536 thus can serve to vertically adjust the support frame 506 and provide stability at the level the set screws 536 are set until mortar is set.

Once the mortar is set, the set tiles can be grouted with the construction plug 538 in place. As discussed above, openings in the structure of the at least one fabric layer 530 allow the grout material to form a mechanical or micromechanical lock to the at least one fabric layer 530.

According to a variation, a capture area A (shown in FIG. 19) is defined between an overhang formed by the construction plug 538 and a rounded upper surface of the wall portion 518. The capture area A is arranged to capture and at least in part fill with the grouting material, improving the transition between the grouting material and the support frame 506. After grouting, the set screws 536 and the construction plug 538 can be removed from the support frame 506.

The installer can then position a drain cover 504 comprising a drain grate having a perforated configuration in the support frame 506 and the drain system 500 is ready for use as shown in FIG. 15. The drain cover 504 and the construction plug 538 are sized and configured so that when the construction plug 538 is removed and the drain cover 504 is installed in the support frame 506, the upper surfaces of the drain cover 504 and the set tiles are substantially flush or flush with one another, enhancing the aesthetics and hydraulic properties of the drain system 500. The drain system 500 can thus allow for easier and faster installation of tile floors that are more appealing than existing systems and which exhibit improved hydraulic properties.

Figure 16:
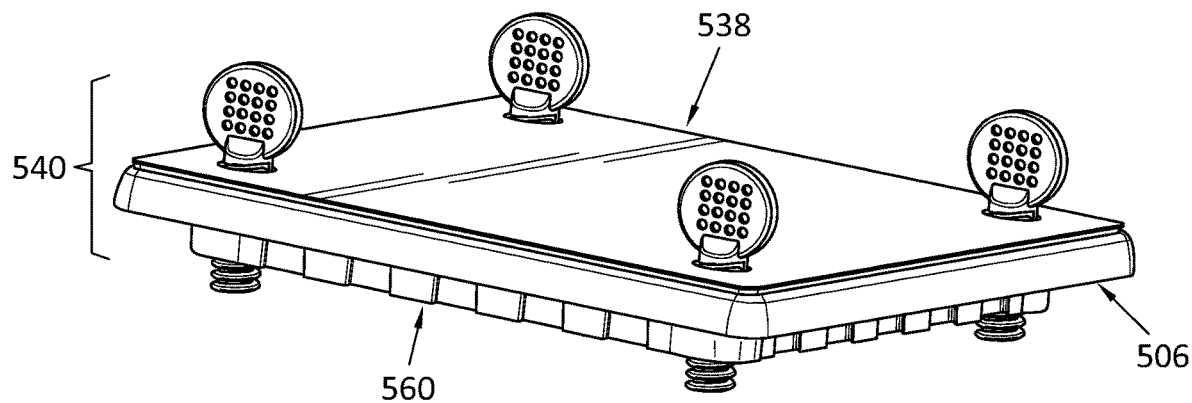
FIG. 16 is a side perspective view of a drain system according to another embodiment.
Figure 17:
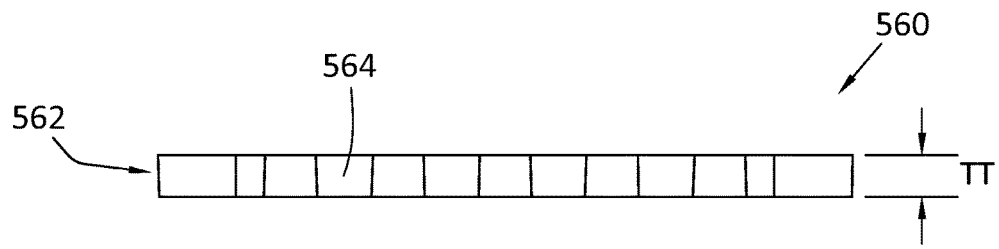
FIG. 17 is a side view of the extension member in FIG. 16.
Figure 18:
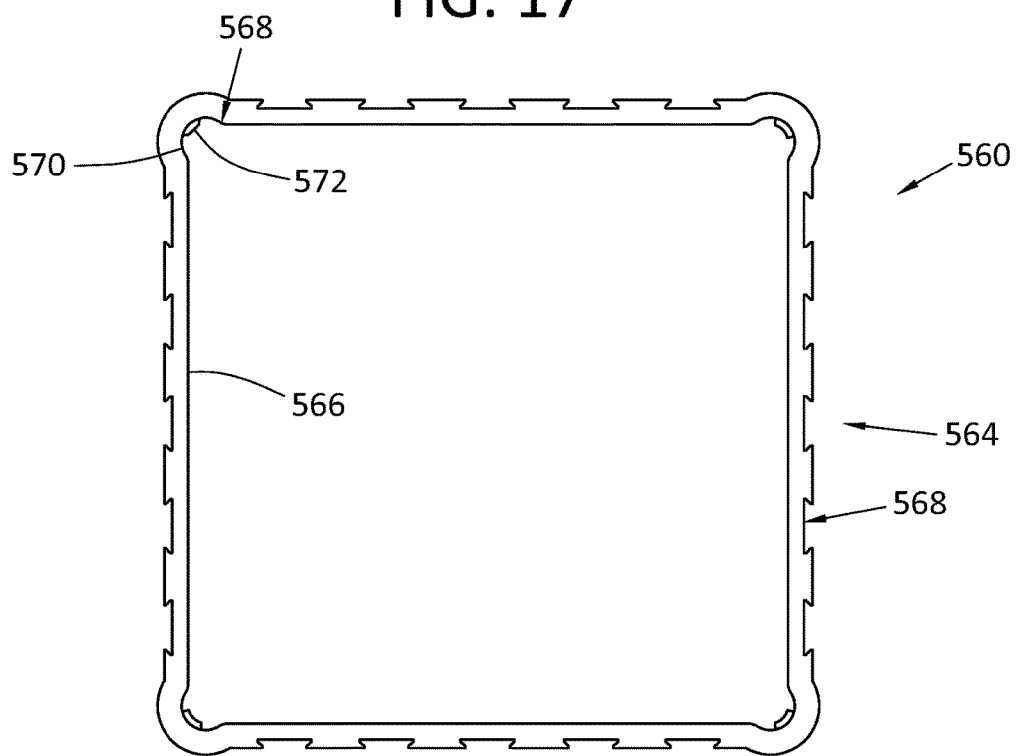
FIG. 18 is a top view of the extension member in FIG. 16.

Optionally, the drain system 500 can include an extension member 560 or skirt as shown in FIGS. 16 and 17. The extension member 560 can be coupled or attached to the bottom of the support frame 506 via the locking system 540 such that the extension member 560, the support frame 506, and the construction plug 538 are held together. This effectively increases an overall thickness of the drain system 500 as needed relative to the upper surface 510 of the drain fixture 502. For example, in some installations, the upper surface 510 of the drain fixture directly below the support frame 506 can be recessed more than in other installations. To help accommodate this greater distance between the tile surface and the upper surface 510, the extension member 560 can be selectively coupled or attached to the bottom of the support frame 506 via the locking system 540. This increases the overall thickness of the drain system 500 to help span the distance between the upper surface 510 and the upper surface of the set tiles, which, in turn, helps the drain system 500 more easily match the upper surface of the drain cover 504 with the set tiles. It also provides structural support to the support frame 506, helping to reinforce the support frame 506 against collapsing or bending during use. The extension member 560 or skirt can be formed of any suitable material.

In the illustrated embodiment, the extension member 560 comprises a frame member defining a thickness TT extending between an upper and lower surface. The thickness TT can be varied to fit different types of drain fixtures. For instance, the extension member 560 can be made available in different sizes having a medium thickness TT, a small thickness TT, a large thickness TT, and/or an extra-large thickness TT.

The extension member 560 includes a wall portion 562 defining a grout facing surface 564 or outer perimeter, and an inner surface 566 opposing the grout facing surface 564 and defining the inner perimeter of the extension member 560. The grout facing surface 564 can be radially inset relative to the tile-facing surface 520 of the support frame 506. This beneficially leaves a greater portion of the bottom surface of the base portion 516 exposed, which, in turn, provides a greater attachment area between the support frame 506 and surrounding grout material.

According to a variation, the grout facing surface 564 defines one or more grout locking features configured to mechanically interlock the extension member 560 with surrounding grout material. The wall portion 562 can also provide a physical barrier that helps limit or prevent the grout material from entering a drain opening of the drain system 500. This improves the aesthetics of the drain system 500 because the grout material is not exposed. It also helps prevent unintentional fouling of the drain fixture from the grout material.

Like the support frame 506 and the construction plug 538, the inner periphery or inner surface 566 includes a third plurality of openings 568 configured to mechanically attach the extension member 560 to the support frame 506. The third openings 568 can comprise receiving spaces or pockets 570 formed in the inner surface 566 of the wall portion 562 and vertically alignable with the first and second openings 526, 544. Each third opening 568 defines at least one thread 572 having a partial circumferential configuration arranged to threadedly engage the set screws 536 when they extend through the second openings 544 into the third openings 568.

In an embodiment, the at least one thread 572 can comprise a quarter thread or one, two, three, or any other number of threads. The threads can have any suitable thread shape. As seen in FIG. 19, the set screw 536 can mesh with the thread 552 on the construction plug 538, the thread 548 on the support frame 506, and the thread 572 on the extension member 560 to lock all the components together. In an embodiment, the threads 548, 552, and 572 can have a common thread geometry and clocking. This beneficially helps ensure proper alignment and function regardless of the support frame 506, the construction plug 538, and the extension member 560 being randomly rotated and assembled.

While the drain system 500 is shown having a square shape, it will be appreciated that the drain system can be configured to have any suitable shape. Further, while the locking system is described as both a coupling and providing a height adjustment means, in other embodiments, it will be appreciated that the coupling means, and the height adjustment means can be separate.

Figure 22:
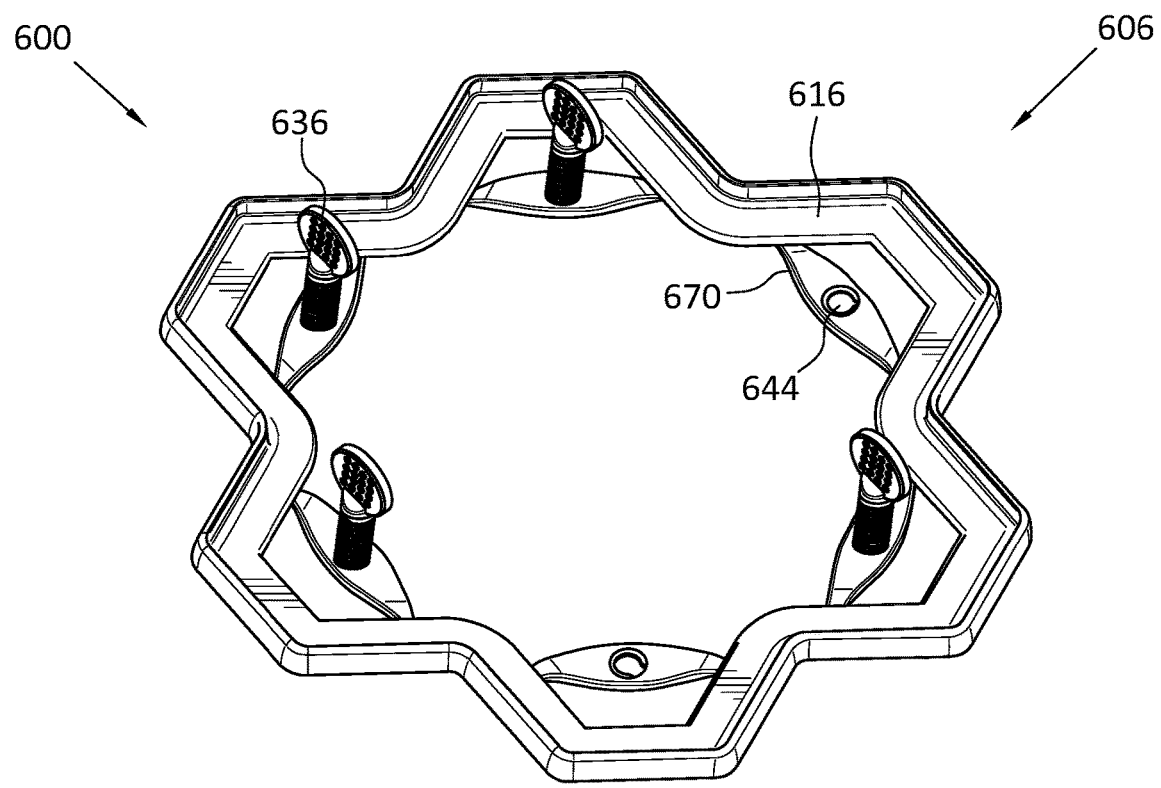
FIG. 22 is a top perspective view of the support frame in FIG. 20 with the drain cover removed for ease of reference.

FIGS. 20-22 illustrate yet another embodiment of a drain system 600. It will be appreciated that the drain system 600 can include the same or similar features as the other embodiments described herein. The drain system 600 comprises a support frame 606 configured to support and position a drain cover or a construction plug 638 over a drain opening in a tile floor, and a locking system 640 configured to selectively and temporarily lock the support frame 606 and the construction plug 638 together.

The drain system 600 is like the drain system 500 except that the support frame 606 and the construction plug 638 have a trapezoidal shape.

The locking system 640 includes a plurality of fasteners or set screws 636, a first plurality of openings 626 defined in the construction plug 638, and a second plurality of openings 644 defined on the support frame 606. Like in the previous embodiment, the first and second openings 626, 644 can each include at least one thread 648, 652 configured to mesh with the set screws 636 and lock the support frame 606 and the construction plug 638 together. In the illustrated embodiment, the thread 648 and the thread 652 are partial threads but in other embodiments they can be complete and/or partial threads.

In the illustrated embodiment, the second openings 644 are formed in a plurality of tabs 670 removably attached to the base portion 616 rather than in the base portion 616. In use, an installer can use fingers or a tool to selectively rotate one or more of the set screws 636 in the openings 626, 644 to level, angle and/or adjust the vertical position or height of the support frame 606 and the construction plug 638 as needed before mortar surrounding and/or supporting the support frame 606 is set. After the mortar is set and grouting, the set screws 636, the construction plug 638, and the tabs 670 can be removed from the support frame 606. This is beneficial because the vertical position of the support frame 606 can be adjusted without having to rotate the support frame 606 or drain head as in the prior art. In addition, the angle of the support frame 606 can be adjusted as desired. Moreover, the set screws 636 provide stability at the level they are set to until mortar solidifies.

According to a variation, each tab 670 includes a pair of breakage points for selectively separating the tab 670 from the base portion 616 upon the application of a target force to the tab 670. The breakage points can be weaker than the remainder of the support frame 606 so that the installer can apply a force to the tabs 670 and cause the tabs 670 to break at the breakage points. In other embodiments, the tabs 670 can be cut away from the base portion 616 by the installer. In other embodiments, the tabs 670 may remain attached to the base portion 616 after an installation.

The installer can then position a drain cover comprising a drain grate having a perforated configuration in the support frame 606 and the drain system 600 is ready for use. The drain system 600, like other embodiments, can allow for easier and faster installation of tile floors that are more appealing than existing systems and which exhibit improved hydraulic properties.

Figure 23:
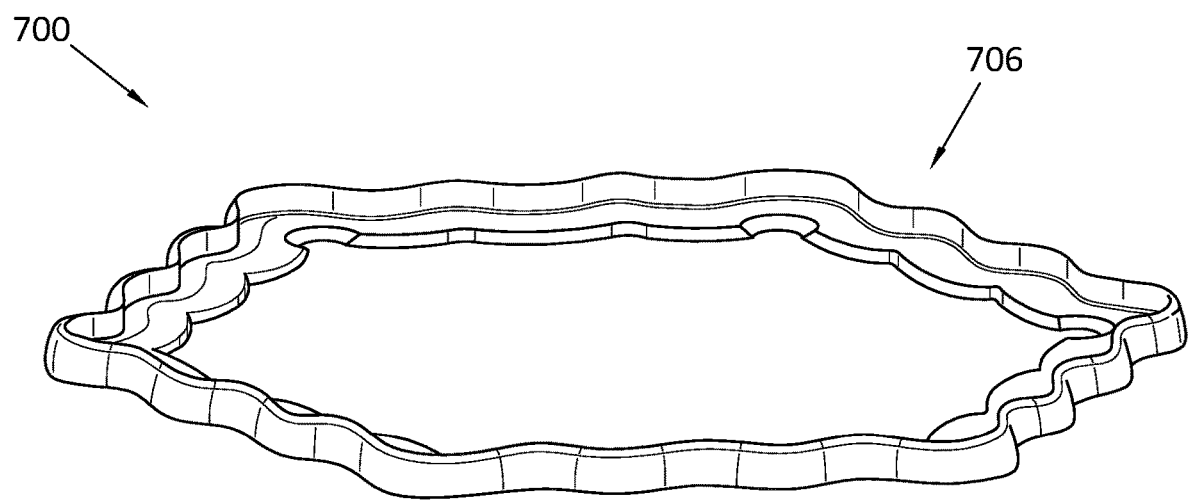
FIG. 23 is a side perspective view of a drain system according to another embodiment.

FIG. 23 illustrates yet another embodiment of a drain system 700. It will be appreciated that the drain system 700 can have the same or similar features as the other embodiments described herein. The drain system 700 includes a support frame 706 alternatively having a cloud, penny, or irregularly shaped outer periphery.

FIGS. 24-28 illustrate yet another embodiment of a drain system 800. It will be appreciated that the drain system 800 can have the same or similar features as other embodiments described herein. For instance, the drain system 800 comprises a support frame 806 configured to support and position a drain cover or construction plug 838 over a drain opening in a tile floor, and a locking system 840 configured to selectively and temporarily lock the support frame 806 and the construction plug 838 together. As shown in FIGS. 24-26, the locking system 840 includes a plurality of fasteners or set screws 836, a first plurality of openings 826 defined in the construction plug 838, and a second plurality of openings 844 defined in the support frame 806. Like in other embodiments, the first and second openings 826, 844 can each include at least one thread 848, 852 configured to mesh with the set screws 836 and lock the support frame 806 and the construction plug 838 together during installation of the support frame 806 in a tile floor. The thread 848 and the thread 852 are partial threads but in other embodiments can be complete and/or partial threads.

The second openings 844 are formed in a plurality of tabs 870 removably attached to the base portion 816. In use, an installer can use fingers or a tool to selectively rotate one or more of the set screws 836 in the openings 826, 844 to level, angle, and/or adjust the vertical position or height of the support frame 806 and the construction plug 838 on the underlying surface as needed before mortar surrounding and/or supporting the support frame 806 is set. After the mortar is set and grouting is complete, the set screws 836, the construction plug 838, and the tabs 870 can be removed from the support frame 806. This is beneficial because the vertical position of the support frame 806 can be adjusted without having to rotate the support frame 806 or a drain head as in the prior art. In addition, the angle of the support frame 806 can be adjusted as desired. Moreover, the set screws 836 provide stability at the level they are set to until mortar solidifies.

As described above in reference to other embodiments, the set screws 836 are arranged to support on, but do not attach to the underlying surface such as a substrate, a drain body or fixture. This beneficially allows the drain system 800 to be used with a variety of drain fixtures or on other underlying surfaces that may or more not have corresponding threaded openings. In addition, because the support frame 806 and the construction plug 838 are configured for installation without any physical attachment (except for the mortar) to the underlying surface or the inside of the drain opening, the drain system 800 can be laterally adjusted, offset, or shifted relative to the drain opening on the underlying surface before the mortal material surrounding and/or supporting the support frame 806 is set. This is advantageous over prior art drain systems that require a threaded attachment or slip attachment between the upper drain components and a lower drain fixture such that the upper drain components are laterally fixed relative to the lower drain fixture, which, in turn, prevents lateral or side to side adjustment of the upper drain components relative to the drain opening. In addition, the drain system 800 can be freely adjusted rotationally on the underlying surface. For instance, the drain system 800 can be rotated on the underlying surface because the openings 826, 844 do not have to align with corresponding openings in the underlying surface as in the prior art systems. The drain system 800 can thus be adjusted vertically, rotationally, and laterally on the underlying surface as described herein.

Optionally, each tab 870 includes a pair of breakage points 872 for selectively separating or removing the tab 870 from the base portion 816 upon the application of a cutting or removal force to the tab 870. The breakage points 872 can be weaker than the remainder of the support frame 806 so that the installer can apply a force to the tabs 870 and cause the tabs 870 to break at or near the breakage points 872. In other embodiments, the tab 870 can be cut along the breakage points 872 to remove the tab 870 from the base portion 816.

As best shown in FIG. 25, the support frame 806 can include one or more grout locking features 842 distributed around the outer perimeter of the support frame 806. The one or more grout locking features 842 are configured to mechanically interlock the support frame 806 with surrounding grout material. The one more grout locking features 842 can also be sized and configured to help set a gap between the support frame 806 and tiles surrounding the support frame 806. This beneficially can help match the grout surrounding the support frame 806 with a width of grout lines intersecting the drain system 800. The one or more grout locking features 842 can have any suitable shape and can engage the surrounding tiles and be embedded in grout material.

Figure 27:
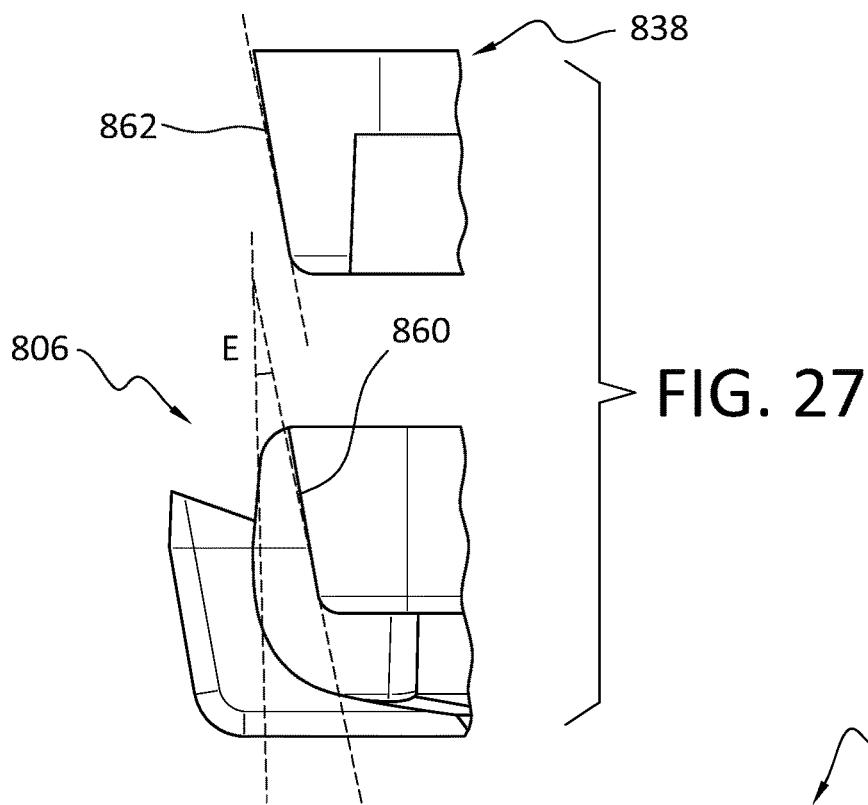
FIG. 27 is an exploded cross section view of the drain system in FIG. 24.

According to an embodiment, the support frame 806 includes one or more release features configured to help facilitate separation of the support frame 806 from the construction plug 838 or the drain cover. For example, the support frame 806 can define a release surface 860 tapering or sloping inwardly from a top of the support frame 806 to define a release angle E relative to vertical as shown in FIG. 27.

The release angle E can help reduce frictional and/or shear forces between the support frame 806 and the construction plug 838 during removal of the construction plug 838, which, in turn, facilitates separation of the construction plug 838 from the support frame 806 after grout material surrounding the support frame 806 cures. In an embodiment, the release angle E can be between about 7 degrees and about 25 degrees between about 10 degrees and about 20 degrees, or between about 13 degrees and about 17 degrees (e.g., preferably about 15 degrees). It will be appreciated that the angle E can be larger or smaller in other embodiments. For instance, the angle E may be varied based on the frictional properties of the grout material (e.g., unsanded grout versus sanded grout).

According to an embodiment, at least a portion of the outer periphery or the sidewall 862 of the construction plug 838 (shown in FIG. 27) can include a corresponding release surface inwardly sloped or tapered to substantially match or correspond to the release angle E on the support frame 806, producing a better fit between the construction plug 838 and the support frame 806.

The release surface 860 can also help reduce the likelihood of damage to the support frame 806 during removal of the construction plug 838. For instance, as the construction plug 838 is lifted vertically from the support frame 806, the release angle E allows the sidewall 862 of the construction plug 838 to pull off or away from the release surface 860 rather than moving along the release surface 860. This is advantageous because a vertical or substantially vertical interface could cause the sidewall 862 to drag along the release surface 860 of the support frame 806, which, in turn, could increase resistance to movement between the two bodies. Optionally, one or more release materials can be applied to the sidewall 862 of the construction plug 838 and/or the release surface 860 of the support frame 806 before grout material is applied over around the support frame 806 and over the construction plug 838. The release materials can be configured to reduce the likelihood or prevent the grout material from bonding the sidewall 862 of the construction plug 838. For instance, the one or more release materials can provide a barrier between the grout material and the support frame 806, facilitating separation of the construction plug 838 from the support frame 806 after grout material applied thereto has cured. The one or more release materials can comprise a wax material or any other suitable release material.

Figure 28:
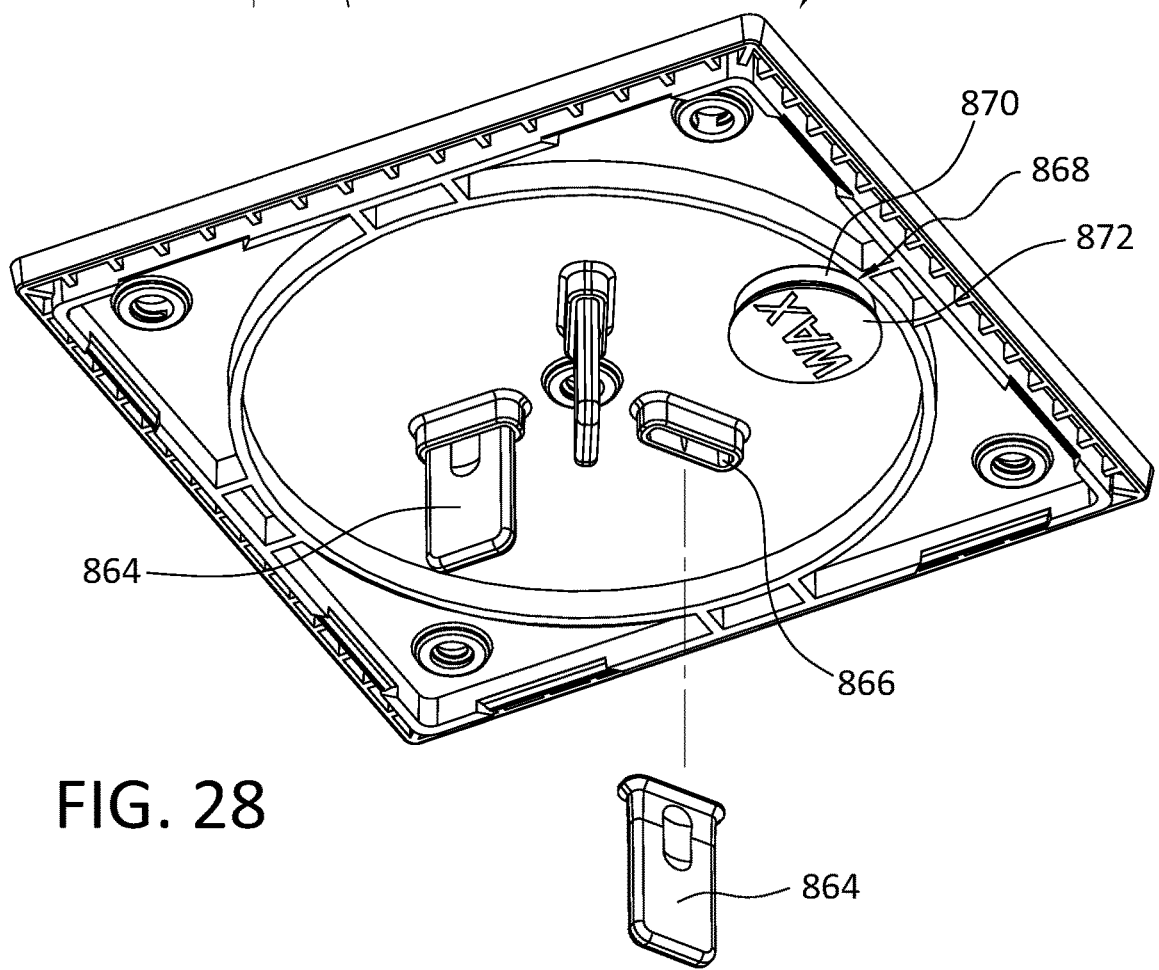
FIG. 28 is a bottom perspective view of the construction plug in FIG. 24.

Like in other embodiments, the support frame 806 can be floatable over a drain opening for lateral and/or rotational adjustment of the support frame 806 relative to the drain opening during installation. According to an embodiment, the support frame 806 and the construction plug 838 can both float over the drain opening and can be aligned with the drain opening as shown in FIG. 28. For example, a plurality of rib members 864 can extend downwardly from a bottom portion of the construction plug 838. The plurality of rib members 864 are sized and configured to selectively interact with the inner diameter of a drain pipe during installation, which, in turn, can selectively restrict lateral movement of the construction plug 838 and the support frame 806 carrying the construction plug 838 over the drain opening. This also aligns or centers the support frame 806 and the construction plug 838 on the drain opening.

If lateral adjustment of the drain system 800 is desired or needed, the plurality of rib members 864 can be removable from corresponding openings 866 located on the bottom portion of the construction plug 838 such that the plurality of rib members 864 do not interact with the inner diameter of the drain pipe and the drain system 800 can be laterally adjusted relative to the drain opening. While three rib members are shown, it will be appreciated that the construction plug 838 can include any suitable number of rib members. The plurality of rib members 864 can also have any suitable shape and can be attached to the construction plug 838 in any suitable manner. For instance, the plurality of rib members 864 can be configured to break away or break off the construction plug 838. In other embodiments, the plurality of rib members 864 can extend from the bottom portion of the construction plug 838 via through-holes defined in the construction plug 838.

The bottom portion of the construction plug 838 can also include a supply 868 of release material configured to help reduce the likelihood of grout material bonding to the sidewall 862, the outer edge, or the outer perimeter of the construction plug 838. In an embodiment, the supply 868 can comprise an open-ended cylinder 876 carrying a wax material and a cover 878 removably attached to the cylinder 876. In use, an installer can conveniently obtain the wax material from the supply 868 and apply it to all or a portion of the sidewall 862 of the construction plug 838 before applying the grout material around the support frame 806 and over the construction plug 838. This beneficially facilitates separation of the construction plug 838 from the support frame 806 after the grout material has cured. It also conveniently eliminates the need for a separate source of wax material, which, in turn, increases the likelihood of installers complying with installation instructions and applying the wax material to the sidewall 862 or outer edge. The supply 868 also can measure out the wax material to help ensure that the installer has a correct or a sufficient amount of wax material applied to the sidewall 862, improving the effectiveness of the wax material in helping the construction plug 838 to cleanly separate from the grout material as described above. A single source of release material is shown but in other embodiments the construction plug 838 can include two, three, or any other number of sources of release material.

An exemplary installation of the drain system 800 according to an embodiment will now be described referring to FIGS. 29A-30. A step 901 can include installing a plurality of tiles 20 around a drain body 802 defining a drain opening 10 as shown in FIG. 29A. Step 901 can include performing a layout or arranging the tiles 20 in a work area 40 comprising the drain body 802 attached to a support surface and a plurality of walls 50 surrounding the support surface. The layout can include arranging the tiles in the work area 40 to selectively install a drain cover (FIG. 29G) in the tiles 20 over the drain opening 10. The layout can include measuring from one or more of the walls 50 surrounding the work area 40 to find a center of the work area 40 so that the drain cover 30 can be centered or selectively positioned within the work area 40 over the drain opening 10. The layout can include measuring from one or more of the walls 50 surrounding the work area 40 to align the drain cover 30 with a dominate wall or another benchmark. As seen, a space 60 can be created in the plurality of tiles 20 around the drain opening 10 that is shaped and sized to accommodate the drain system 800 over the drain opening 10. Step 901 can include applying a mortar to the support surface. This can include spreading or screeding a layer of thinset mortar over the support surface. Step 901 can include installing or setting the plurality of tiles 20 in the thinset mortar around the drain opening 10.

A step 903 can include installing the drain system 800 in the space 60 over the drain opening 10. Because the drain system 800 can be selectively floated over the drain opening 10, the drain system 800 can off center or laterally offset over the drain opening 10. This beneficially helps the drain system 800 blend into a finished tile floor compared to prior art drain systems that can only be installed on center the drain opening 10, without any way to adjust the location of the drain system 800. Step 903 can include setting the drain system 800 in mortar (e.g., thinset) with the construction plug 838 coupled to the support frame 806 by the set screws 836. Step 903 can include manipulating the one or more set screws 836 to adjust the height and/or angle of the drain system 800 on the drain body 802 over the drain opening 10. For example, an installer can use fingers or a tool to selectively rotate one or more of the set screws 836 to level, angle and/or adjust the vertical position or height of the drain system 800 as needed before the mortar cures. Referring to FIG. 29C, the step 903 can include applying one or more release materials (e.g., wax material) to the construction plug 838 before installing the construction plug 838 in the support frame 806 or after the support frame 806 is set in the mortar.

Figure 29B:
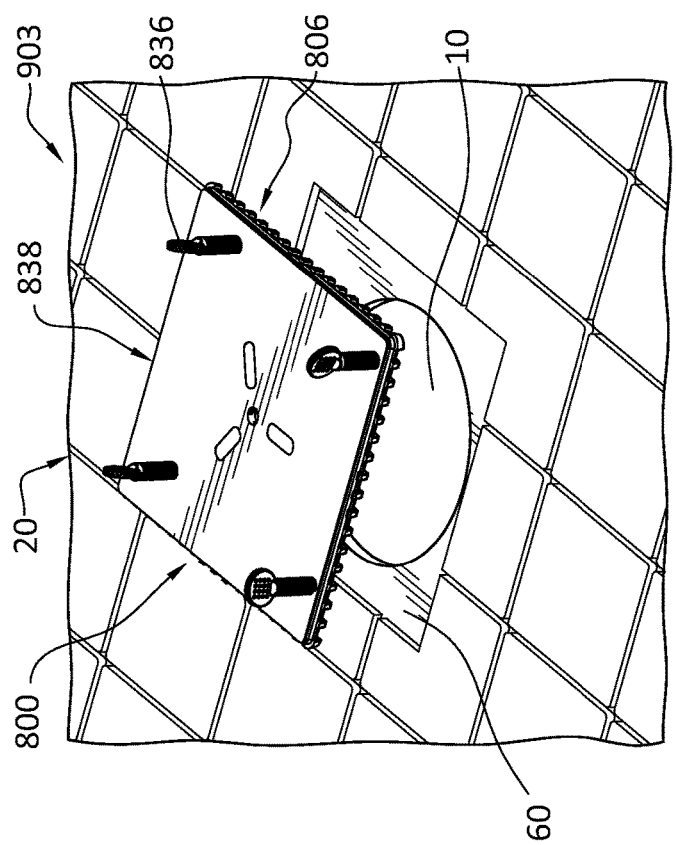
FIGS. 29A-29H illustrate installation of the drain system in FIG. 24 according to an embodiment.
Figure 29D:
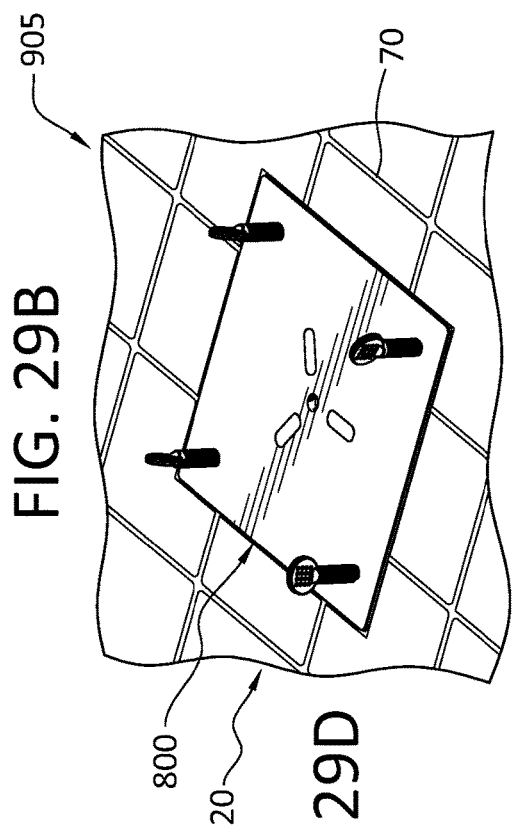
Figure 29A:
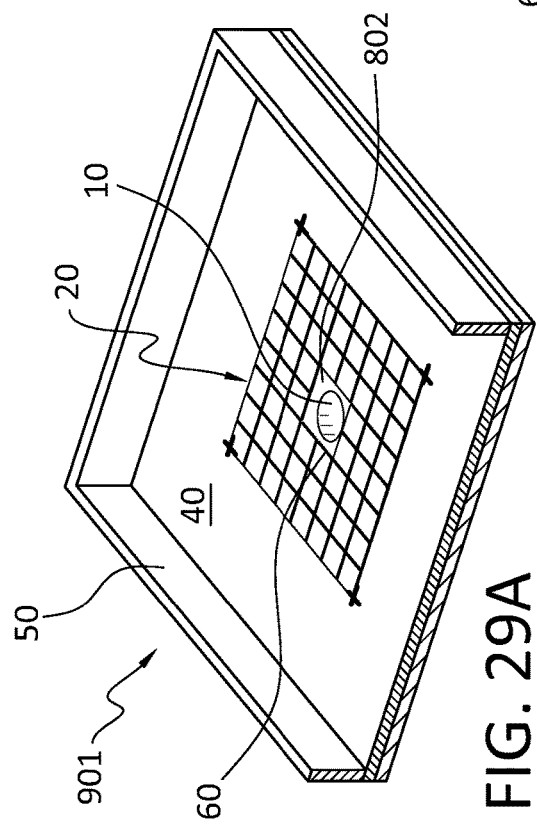
Figure 29C:
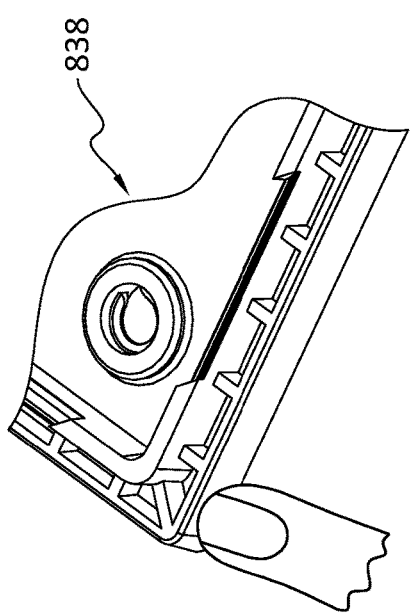

A step 905 can include grouting the tiles 20 as shown in FIG. 29D. Step 905 can include applying a grout material 70 over the tiles 20 and around the support frame 806 and the construction plug 838. This can fill in the spaces or gaps between the plurality of tiles 20 and between the plurality of tiles 20 and support frame 806. Step 905 can include placing the grout material 70 on the tiles 20 and then pressing the grout material 70 into the joints or gaps to fill them completely. This can include spreading the grout material 70 using a grout float or other suitable tool. In an embodiment, the grout material 70 fills in around the support frame 806, mechanically locking the support frame 806 to the tiles 20. The one or more grout locking features 842 (shown in FIG. 29B) can help locate the plurality of tiles 20 relative to the support frame 806. This beneficially can help maintain a uniform gap around the support frame 806 and align the gap surrounding the support frame 806 with gaps between the nearest tiles 20. This helps the support frame 806 blend into the finished tile floor. While a plurality of rectangular tiles are shown, it will be understood that the plurality of tiles 20 can have any suitable shape and size and the drain system 800 can be modified accordingly. The solid configuration of the construction plug 838 alone and in combination with the support frame 806 can help prevent the grout material from entering the drain opening 10.

Figure 29F:
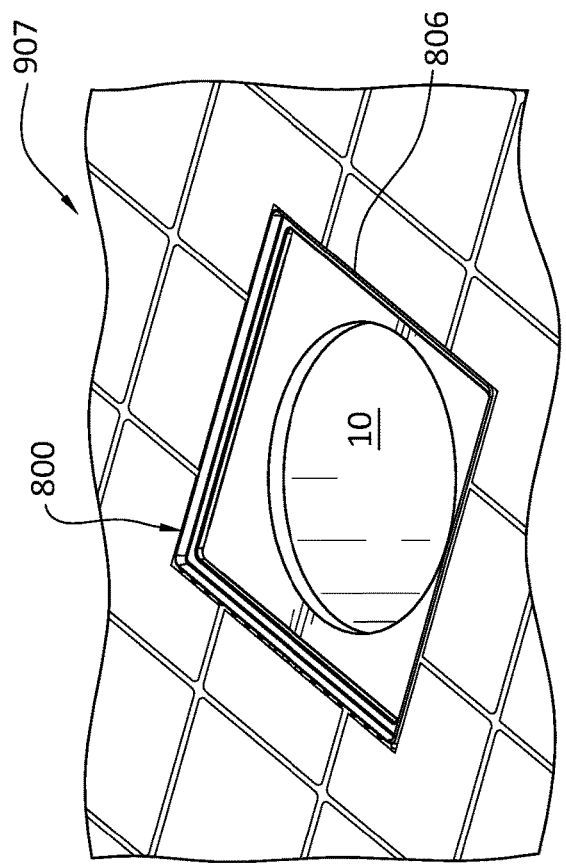
Figure 29E:
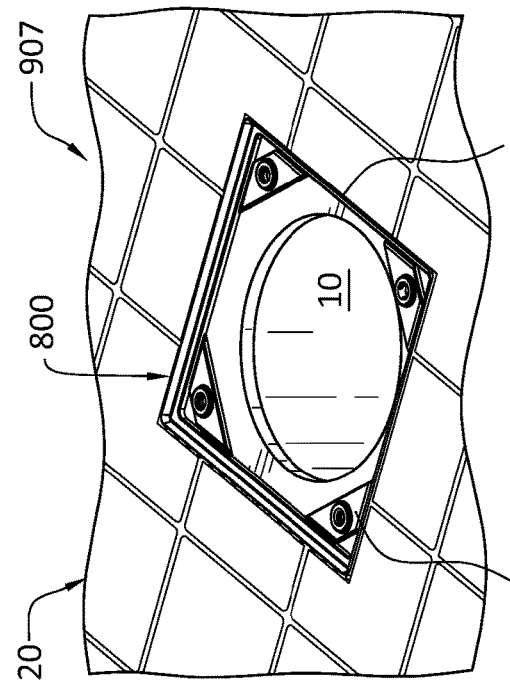

A step 907 can include removing the construction plug 838 from the drain opening 10 after the grout cures. Step 907 can include separating and removing the construction plug 838 from the support frame 806. For instance, the set screws 836 can be removed from the openings 844 and 826 and the construction plug 838 can be pulled off the support frame 806 and removed. As described above, the release surface 860 of the support frame 806 tapers or slopes inward from the top to facilitate separation of the construction plug 838 from the support frame 806. For instance, the release angle E of the release surface 860 is configured to help reduce frictional and/or shear forces between the support frame 806 and the construction plug 838 during removal of the construction plug 838, which, in turn, facilitates separation of the construction plug 838 from the support frame 806. In an embodiment, the release angle E can be about 15 degrees. Step 907 can include removing the tabs 870 from the support frame 806 as shown in FIG. 29F.

As described above, the one or more release materials pre-applied to the construction plug 838 can provide a barrier between the support frame 806 and the construction plug 838, facilitating separation of the construction plug 838 from the support frame 806. With the construction plug 838 removed, it can be observed that an upper end of the support frame 806 is concealed below the grout material. This beneficially improves the aesthetics of the finished tiled floor because the grout lines appear uninterrupted by the support frame 806.

Figure 29G:
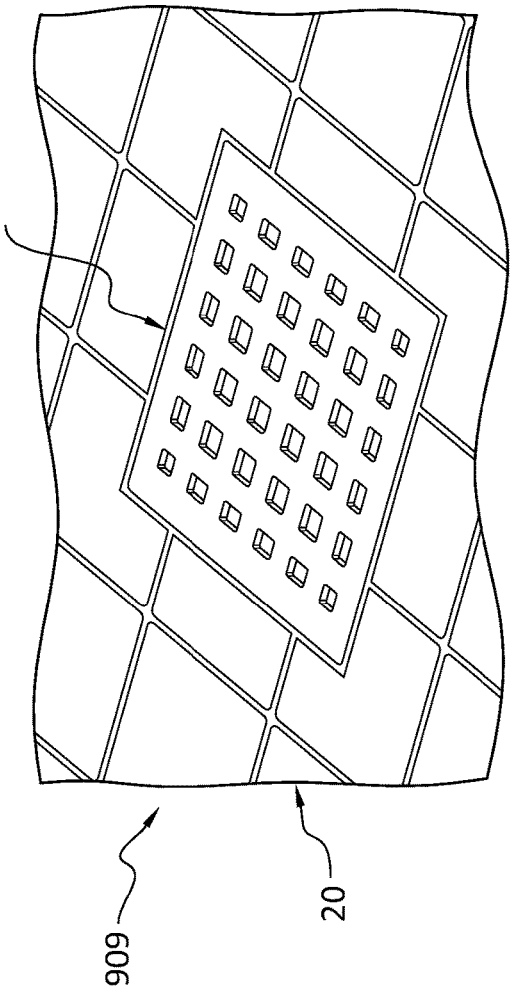

A step 909 can include installing the drain cover 30 in the tile floor as shown in FIG. 29G. The step 909 can include installing the drain cover 30 on the support frame 806. As seen, the support frame 806 is sized and configured to mount the drain cover 30 flush or nearly flush with the upper surface of the nearest tiles 20. The outer portion of the bottom side of the drain cover 30 can solidly fit on the support frame 806.

Figure 29H:
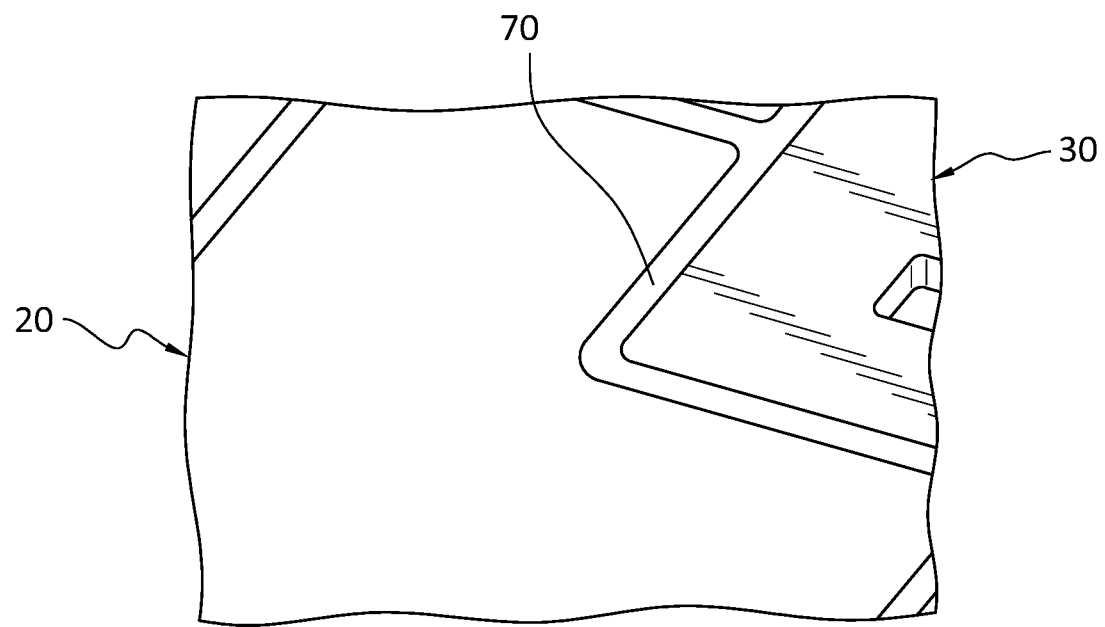
Figure 30:
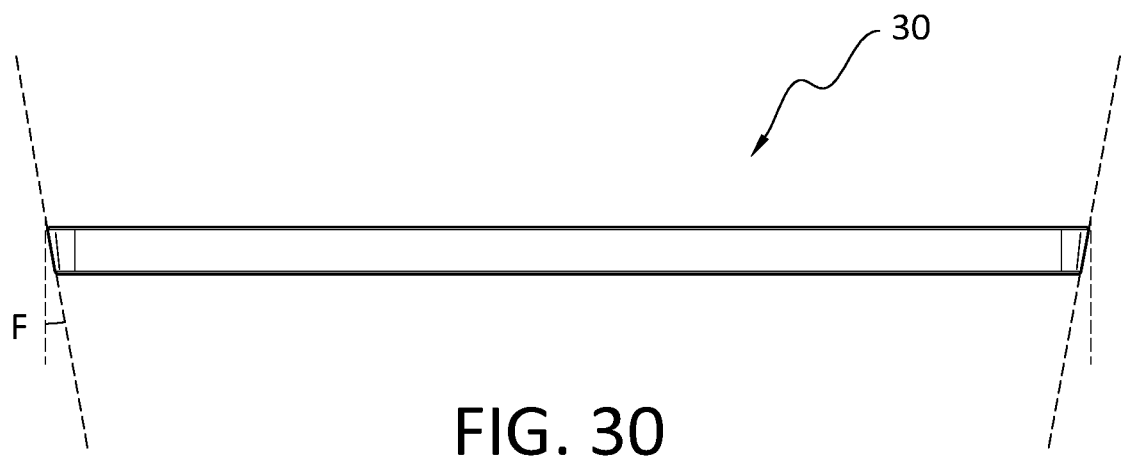
FIG. 30 is a side view of the drain cover in FIG. 29H.
Figure 31:
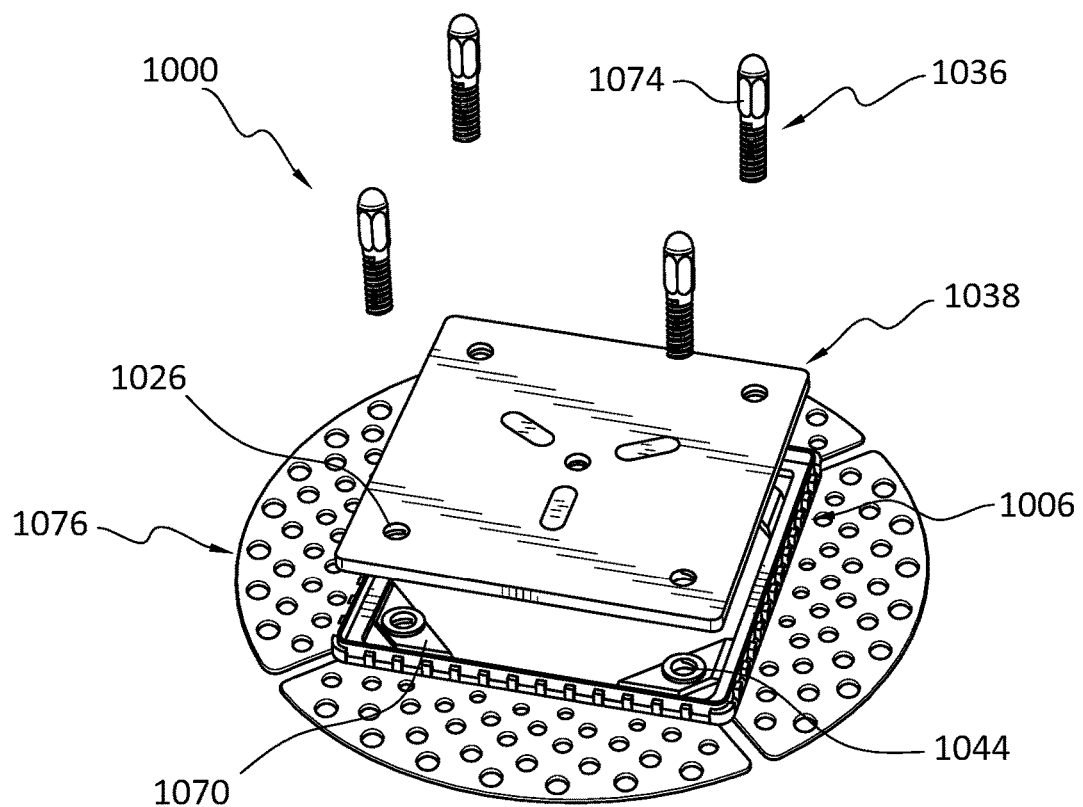
FIG. 31 is a top exploded view of a drain system according to another embodiment.

Referring to FIGS. 29H and 30, the outer periphery or sidewall 862 of the drain cover 30 can define an angle F relative to vertical generally corresponding to the release angle E, improving the fit between the drain cover 30 and the support frame 806. In addition, the grout lines between the tiles 20 smoothly transition into the drain cover 30. This beneficially simplifies the installation of the drain cover 30 in the tile floor as the drain cover 30 interfaces with and naturally blends with the tiles 20 and grout lines running between the tiles 20. In use, water runs over the tiles 20 toward the drain cover 30 where it passes over the top of the grout material concealing the support frame 806 and across the drain cover 30. The water than falls through the holes in the drain cover 30 and into the drain opening 10. From the drain opening 10, the water passes through the drain body 802 and into a connector drain pipe that conveys it away from the finished tile floor area.

FIGS. 31-35 illustrate yet another embodiment of a drain system 1000. Again, it will be appreciated that the drain system 1000 can have the same or similar features as other embodiments described herein. For example, the drain system 1000 can include a support frame 1006, a construction plug 1038, and a locking system configured to selectively lock the support frame 1006 and the construction plug 1038 together. The support frame 1006 can include one or more flange elements 1076 described below.

The locking system can include a plurality of fasteners or set screws 1036, a first plurality of openings 1026 defined in the construction plug 1038, and a second plurality of openings 1044 defined in a plurality of tabs 1070 removably attached to the support frame 1006. Like in other embodiments, the first and second openings 1026, 1044 can each include at least one thread configured to mesh with the set screws 1036 and selectively lock the support frame 1006 and the construction plug 1038 together during installation of the support frame 1006 in a tile floor. The threads can be partial or complete threads.

As seen, the set screws 1036 can include a head portion 1074. The head portion 1074 can have a hexagonal configuration arranged to reduce the amount of effort required for an installer to turn the set screws 1036 between the thumb and the forefinger of the user. Alternatively, the head portion 1074 can be configured to interface with a female socket. This beneficially allows an installer to use a drill or other tool including a socket to manipulate the set screws easily and quickly.

Figure 32:
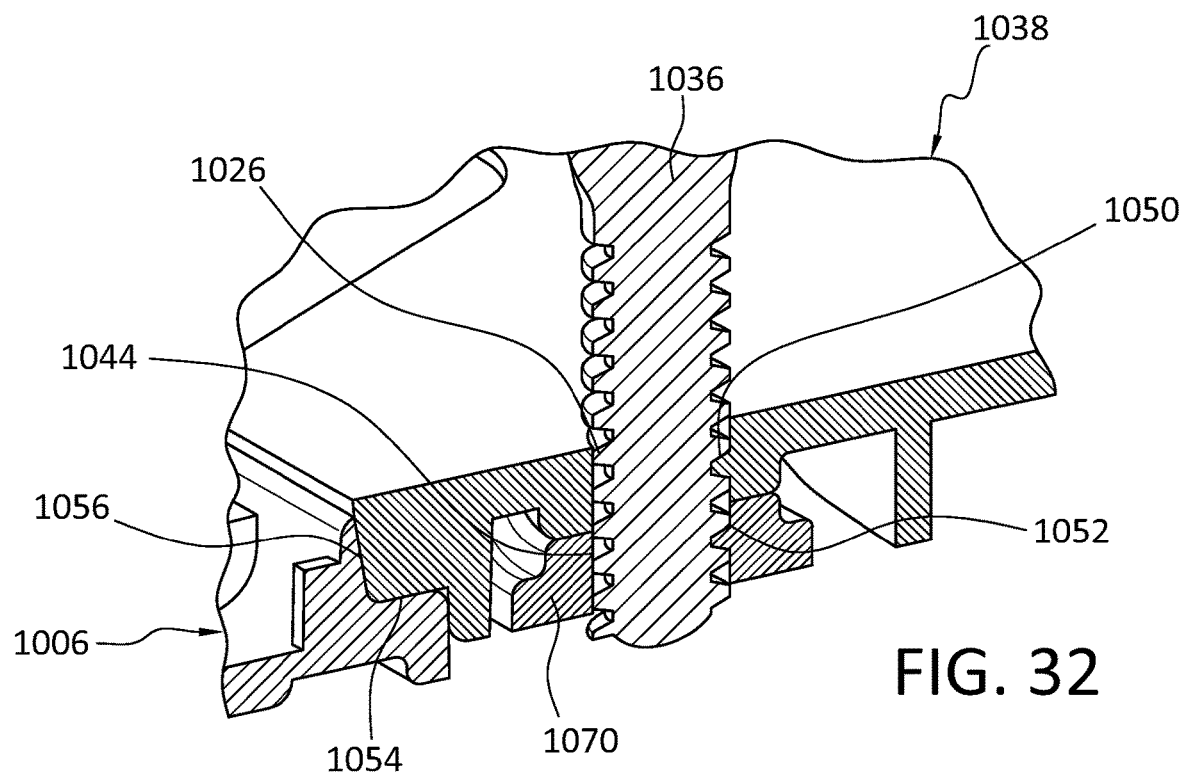
FIG. 32 is a detailed cross section view of the drain system in FIG. 31.

The set screws 1036 can also be configured to help maintain the construction plug 1038 and the support frame 1006 together regardless of a clocked orientation of the construction plug 1038 and the support frame 1006. For instance, the set screws 1036 can help selectively lock the support frame 1006 and the construction plug 1038 together with the support frame 1006 rotated 90 degrees, 180 degrees, 270 degrees, and 360 degrees clockwise or counterclockwise relative to the construction plug 1038. The set screws 1036 can also help keep the drain system 1000 leveled and supported on a drain fixture comprising a drain body 1002 as mortar and/or grout cure. For instance, as shown in FIG. 32, a first contact point 1050 between the thread of the set screw 1036 and a thread in the opening 1026, a second contact point 1052 between the thread of the set screw 1036 and a thread in the opening 1044, and a third contact point 1054 between the construction plug 1038 and the base of the support frame 1006, and a fourth contact point 1056 between the sidewall of the construction plug 1038 and a release surface of the support frame 1006 can work in conjunction to prevent relative translation and rotation between the support frame 1006 and the construction plug 1038 as mortar and/or grout cure.

Figure 33:
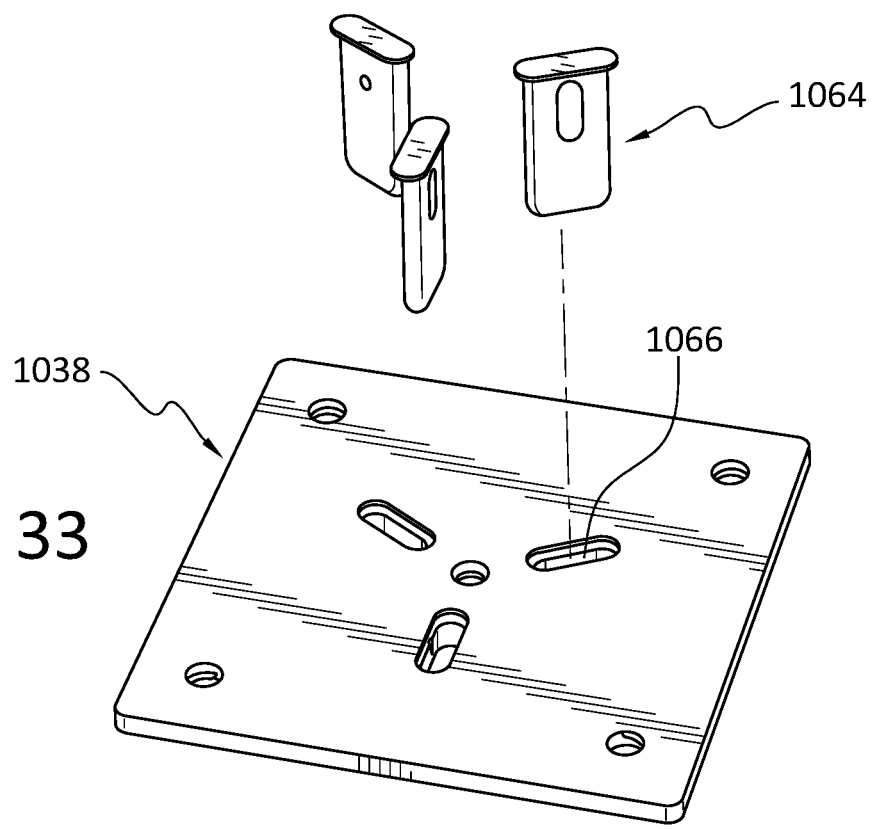
FIG. 33 is a top exploded view of the construction plug in FIG. 31.

Referring the FIG. 33, a plurality of rib members 1064 can selectively extend downwardly from a bottom portion of the construction plug 1038. Like in other embodiments, the rib members 1064 are sized and configured to selectively interact with the inner diameter of a drain pipe (shown in FIG. 36) during installation, which, in turn, can selectively restrict lateral movement of the construction plug 1038 over the drain opening 1012. This also can align or center the drain system 1000 on the drain opening 1012. As seen, the rib members 1064 can be selectively positioned in through holes 1066 defined in the construction plug 1038. For instance, the rib members 1064 can be inserted into the through holes 1066 until an enlarged head portion of the rib member 1064 engages with a recessed shoulder defined in the through hole 1066 and the lower portion of the rib member 1064 engages with the wall of the drain opening 1012. If lateral adjustment of the drain system 1000 is desired, the rib members 1064 can be removed from the through holes 1066.

It should be noted that because the rib members 1064 are separate elements from the construction plug 1038, production of the construction plug 1038 is advantageously simplified. Also, the rib members 1064 can be substantially straight without a draft angle, which, in turn, allows the rib members 1064 to fit closer to the inner diameter of the drain pipe. This beneficially reduces lateral movement of the drain system 1000 when the rib members 1064 are being used. The rib members 1064 can also be sized and configured such that the rib members 1064 are not affected by pipe depth.

Referring to FIGS. 35-36, like in other embodiments, the drain system 1000 can include one or more features to help create continuity between the drain system 1000 and adjacent tiles. For example, the drain system 1000 can include the one or more flange elements 1076 extending radially outward from a bottom portion of the support frame 1006. The one or more flange elements 1076 are configured to extend below adjacent tiles and mortar supporting adjacent tiles, providing enhanced continuity between the support frame 1006 and the tiles. This allows the one or more flange elements 1076 to selectively support and/or elevate adjacent tiles relative to the drain body 1002, increasing the compatibility of the drain system 1000 with tiles of different sizes and thicknesses. For instance, if the height of the drain system 1000 is too much for a thickness of tiles (e.g., 1 inch hex mosaic tiles) being installed around the support frame 1006, the tiles can be installed on one or more of the flange elements 1076 extending from the support frame 1006 to support and position the top surfaces of the tiles flush or substantially flush with an upper surface of the construction plug 1038. This is advantageous because an installer can more easily match the height of the adjacent tiles with the drain system 1000 without having to add or float additional mortar below the tiles, which is generally disfavored by installers.

It is also advantageous because it increases the contact area between the support frame 1006 and an underlying drain body 1002, which, in turn, can help stabilize the support frame 1006 on the drain body 1002. For instance, the flange elements 1076 can help stabilize the support frame 1006 on a drain body 1002 with a bond flange 1010 having a recessed or conical surface around a drain opening 1012. This can be particularly advantageous if the support frame 1006 is installed off center of the drain opening 1012. It will be appreciated that the distance between the upper surface of the flange elements 1076 and the upper surface of the drain system 1000 can be varied based on the application. For instance, the distance between the upper surface of the flange elements 1076 and the upper surface of the drain system 1000 can be smaller to accommodate thinner mosaic tiles. To accommodate larger thicker tiles, the flange elements 1076 can be removed as described below.

The one or more flange elements 1076 can extend entirely or partially around the outer periphery of the support frame 1006. In an embodiment, gaps or cutouts 1078 can be defined at the corner areas of the support frame 1006 or where two or more of the flange elements 1076 near one another. These cutouts 1078 permit independent movement of the flange elements 1076 along different sides of the support frame 1006 by allowing one flange element 1076 to move without moving the other flange elements 1076. In other embodiments, the flange elements 1076 can extend only partially around the outer periphery of the support frame 1006.

In an embodiment, the flange elements 1076 are configured to retain mortar and/or grout applied thereto. For instance, the flange elements 1076 can define openings 1080 configured to receive mortar (e.g., thinset) and force a mechanical lock between the mortar and the flange elements 1076. These openings 1080 can fill with grout and/or mortar applied to the flange elements 1076 to attach the support frame 1006 more securely to tiles installed around the support frame 1006. As mortar is applied to the flange elements 1076 during a tile installation project, the mortar can penetrate or extend into the openings 1080 to mechanically lock the mortar with the flange elements 1076. This beneficially helps retain the tiles and the drain system 1000 in a desired configuration. The flange elements 1076 are shown having an inner straight edge, an outer arcuate edge, with angled ends between the inner and outer edges, but can have any suitable shape. The one or more flange elements 1076 can be formed of plastic, polymer, or any other suitable material.

Figure 34:
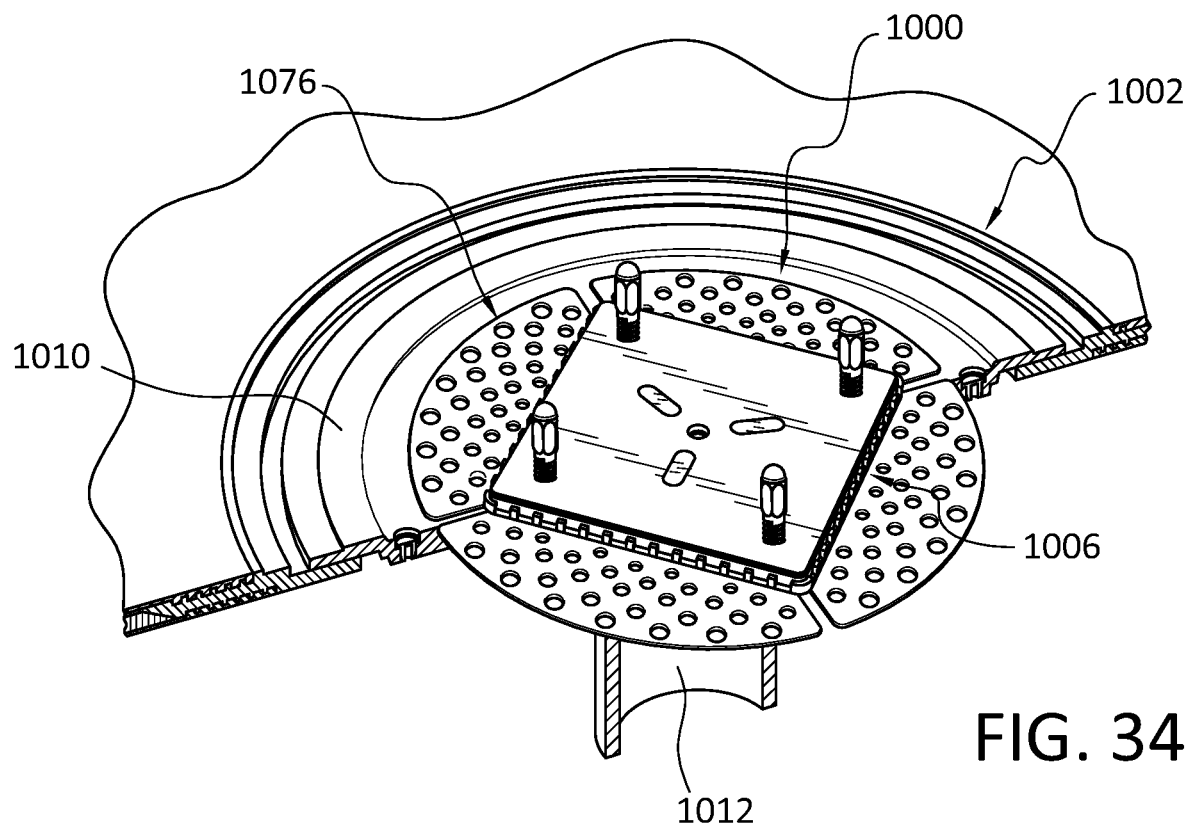
FIG. 34 is a top view of the drain system in FIG. 31 positioned on a drain body according to an embodiment.

According to a variation, the flange elements 1076 are removably attached to the bottom portion of the support frame 1006. Referring to FIGS. 33 and 34, each flange element 1076 can include a plurality of breakage points for selectively separating the flange element 1076 from the support frame 1006 upon application of a target force to the flange element 1076. The breakage points can be weaker than the remainder of the support frame 1006 so that the installer can apply a force to the flange element 1076 and cause the one or more of the flange elements 1076 to break at the breakage points. In an embodiment, the breakage points can comprise alternating attachments and openings defined between the flange element 1076 and the support frame 1006. In other embodiments, the flange elements 1076 can be cut away from the support frame 1006 by the installer as desired.

FIG. 37 shows the drain system 1000 with the flange elements 1076 removed. Optionally, the drain system 1000 can include an extension member 1060 or skirt as shown in FIG. 37. The extension member 1060 can be coupled or attached to the bottom of the support frame 1006 such that the extension member 1060, the support frame 1006, and the construction plug 1038 are held together. This effectively increases an overall thickness of the drain system 1000 as needed relative to an upper surface of the drain body 1002. For example, in some installations, the upper surface of the drain body 1002 can be recessed more than in other installations. To help accommodate this greater distance between the tile surface and the upper surface, the extension member 1060 can be selectively coupled or attached to the bottom of the support frame 1006. This increases the overall thickness of the drain system 1000 to help span the distance between the upper surface of the drain body 1002 and the upper surface of the installed tiles, which, in turn, helps the drain system 1000 more easily match the upper surface of a drain cover with the installed tiles. It can also provide structural support to the support frame 1006, helping to reinforce the support frame 1006 against collapsing or bending during use. The extension member 1060 can be formed of any suitable material.

FIGS. 38-40 illustrate alternative drain systems of the present disclosure having different shapes. It will be appreciated that these drain systems can have the same or similar features as other embodiments described herein. FIG. 38 illustrates a drain system 1100 comprising a support frame 1106 having a hexagonal shape and a plurality of flange elements 1176 positionable over a drain body 1102. The support frame 1106 can be configured to receive and support a hexagonal shaped drain cover in a tiled floor. The flange elements 1176 are removably attached to the support frame 1106.

FIG. 39 illustrates a drain system 1200 comprising a support frame 1206 having a cloud, penny, or irregularly shaped outer periphery and a removable flange element 1276 extending about an entire outer periphery of the support frame 1206. As seen, the flange element 1276 can define a plurality of slots 1278 configured to capture and form a mechanical lock with mortar or grout material. The slots 1278 can be circumferentially distributed and oriented radially outward. In an embodiment, the flange element 1276 can be cut at one or more of the slots 1278 to remove different portions of the flange element 1276 as needed. Like in other embodiments, the support frame 1206 can be configured to receive and support a cloud shaped drain cover in a tiled floor. FIG. 40 illustrates a drain system 1300 including a support frame 1306 having a shape comprising a plurality of hexagonal segments and a flange element 1376 extending radially outward from the support frame 1306. A plurality of slots 1378 are defined in the flange element 1376 and arranged to capture mortar and grout and to facilitate removal of the flange element 1376 from the support frame 1306.

The various aspects and embodiments disclosed herein are for purposes of illustration and are not intended to be limiting. While the support frame is generally described as being surrounded by a plurality of tiles, in other embodiments, the support frame can be surrounded by one tile. While set screws are described, in other embodiments the drain systems can include other vertical or height adjustment mechanisms. While the supply of release material is described as being included on the construction plug, in other embodiments, the supply of the release material can be included on a perforated drain cover. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. A drain system comprising:
a support frame configured to support and position a drain cover over a drain opening in a tile floor, the support frame including:
a base portion;
a wall portion projecting upwardly from the base portion to define a seat for the drain cover within the support frame; and
a release surface on the wall portion tapering and sloping inwardly from a top of the wall portion, the release surface arranged to interface with the drain cover and reduce frictional and shear forces between the drain cover and the support frame during removal of the drain cover from the support frame.

2. The drain system of claim 1, wherein the release surface defines a release angle of between about 10 degrees and about 20 degrees relative to vertical.

3. The drain system of claim 2, wherein the release angle comprises about 15 degrees relative to vertical.

4. The drain system of claim 1, wherein the drain cover comprises a construction plug selectively couplable to the support frame over the drain opening during a tile installation project.

5. The drain system of claim 4, wherein the construction plug defines a plurality of access holes corresponding to a plurality of set screws threadedly attached to the support frame such that at least one of a vertical position and an angle of the support frame relative to the drain opening is adjustable with the construction plug positioned in the support frame.

6. The drain system of claim 4, further comprising a plurality of rib members extending downwardly from a bottom portion of the construction plug, the plurality of rib members configured to selectively interact with an inner diameter of a drain pipe fluidly connected to the drain opening, and restrict lateral movement of the construction plug and the support frame over the drain opening.

7. The drain system of claim 6, wherein the plurality of rib members are removably attached to the construction plug.

8. The drain system of claim 7, wherein the plurality of rib members are removably positioned within through-holes defined in the construction plug.

9. The drain system of claim 6, wherein the plurality of rib members are configured to break away from the bottom portion of the construction plug.

10. The drain system of claim 4, wherein the construction plug includes a supply of release material configured to reduce a likelihood of grout material bonding the construction plug to the support frame.

11. The drain system of claim 10, wherein the supply comprises an open-ended cylinder carrying the release material comprising a wax material.

12. The drain system of claim 11, wherein the wax material is applicable to the release surface of the support frame to facilitate separation of the construction plug and the support frame.

13. The drain system of claim 1, wherein the support frame includes one or more flange elements extending radially toward from a bottom portion of the support frame, the one or more flange elements configured to extend below adjacent tiles and mortar supporting the adjacent tiles.

14. The drain system of claim 13, wherein the one or more flange elements support and elevate the adjacent tiles.

15. The drain system of claim 13, wherein the one or more flange elements are removably attached to the bottom portion of the support frame.

16. A drain system comprising:
a drain cover;
a support frame configured to support and position the drain cover over a drain opening in a tile floor, the support frame including:
a base portion;
a wall portion projecting upwardly from the base portion to define a seat for the drain cover within the support frame; and
a release surface on the wall portion tapering and sloping inwardly from a top of the wall portion, the release surface arranged to interface with the drain cover and reduce frictional and shear forces between the drain cover and the support frame during removal of the drain cover from the support frame; and a supply of release material carried on the drain cover, the release material configured to facilitate separation of the drain cover and the support frame.

17. The drain system of claim 16, wherein the drain cover comprises a construction plug having a plurality of rib members configured to selectively interact with an inner diameter of a drain pipe fluidly connected to the drain opening, and restrict lateral movement of the construction plug and the support frame over the drain opening.

18. The drain system of claim 17, wherein the plurality of rib members are removably positioned in through holes defined in the construction plug.

19. A drain system comprising:
a drain fixture defining a drain opening;
a drain cover positionable over the drain opening; and
a support frame configured to support and position the drain cover over the drain opening, the support frame including:
a base portion;
a wall portion projecting upwardly from the base portion to define a seat for the drain cover within the support frame; and
a release surface on the wall portion tapering and sloping inwardly from a top of the wall portion, the release surface arranged to interface with the drain cover and reduce frictional and shear forces between the drain cover and the support frame during removal of the drain cover from the support frame.

20. The drain system of claim 19, wherein the drain cover comprises a construction plug having a plurality of rib members configured to selectively interact with an inner diameter of a drain pipe fluidly connected to the drain opening, and restrict lateral movement of the construction plug and the support frame over the drain opening.

* * * * *